(12) United States Patent
Hoshi

(10) Patent No.: US 8,011,802 B2
(45) Date of Patent: Sep. 6, 2011

(54) OPTICAL FILM, LIGHTING DEVICE AND DISPLAY UNIT

(75) Inventor: Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 12/175,671

(22) Filed: Jul. 18, 2008

(65) Prior Publication Data

US 2009/0027885 A1    Jan. 29, 2009

(30) Foreign Application Priority Data

Jul. 24, 2007   (JP) ................. 2007-192171

(51) Int. Cl.
  *F21V 5/00*   (2006.01)
(52) U.S. Cl. ............... 362/244; 362/249.02; 362/235; 362/227; 362/330; 362/97.3
(58) Field of Classification Search ............ 362/227, 362/235, 249.01, 249.02, 800, 308, 309, 362/310, 330, 337, 37.3, 236, 237
  See application file for complete search history.

(56) References Cited

U.S. PATENT DOCUMENTS

| | | | | |
|---|---|---|---|---|
| 3,716,710 | A * | 2/1973 | Clostermann et al. | 362/339 |
| 7,560,745 | B2 * | 7/2009 | Kim et al. | 257/98 |
| 7,637,647 | B2 * | 12/2009 | Chen | 362/613 |
| 2005/0243551 | A1 | 11/2005 | Onishi et al. | |

FOREIGN PATENT DOCUMENTS

| | | |
|---|---|---|
| JP | 54-155244 | 12/1979 |
| JP | 2007-114158 | 9/2000 |
| JP | 3114467 | 9/2000 |
| JP | 2005-326819 | 11/2005 |
| WO | 2006107105 | 10/2006 |

OTHER PUBLICATIONS

Japanese Office Action (2008122122) issued on Jul. 28, 2009.
Japanese Office Action for corresponding JP2008-122122 issued Mar. 23, 2010.

* cited by examiner

*Primary Examiner* — Anable M Ton
(74) *Attorney, Agent, or Firm* — K&L Gates LLP

(57) ABSTRACT

A display unit capable of reducing luminance irregularity when using a point light source is provided. The display unit includes: a panel driven based on an image signal; a plurality of point light sources arranged in a region facing the panel; and an optical sheet arranged between the panel and the plurality of point light sources. The plurality of point light sources are arranged in a first direction and also in a second direction intersecting with the first direction, and the optical sheet has a tridimensional configuration that includes a first ridgeline extending in a third direction intersecting with the first and second directions, and a second ridgeline extending in a direction intersecting with the first, second and third directions.

13 Claims, 29 Drawing Sheets

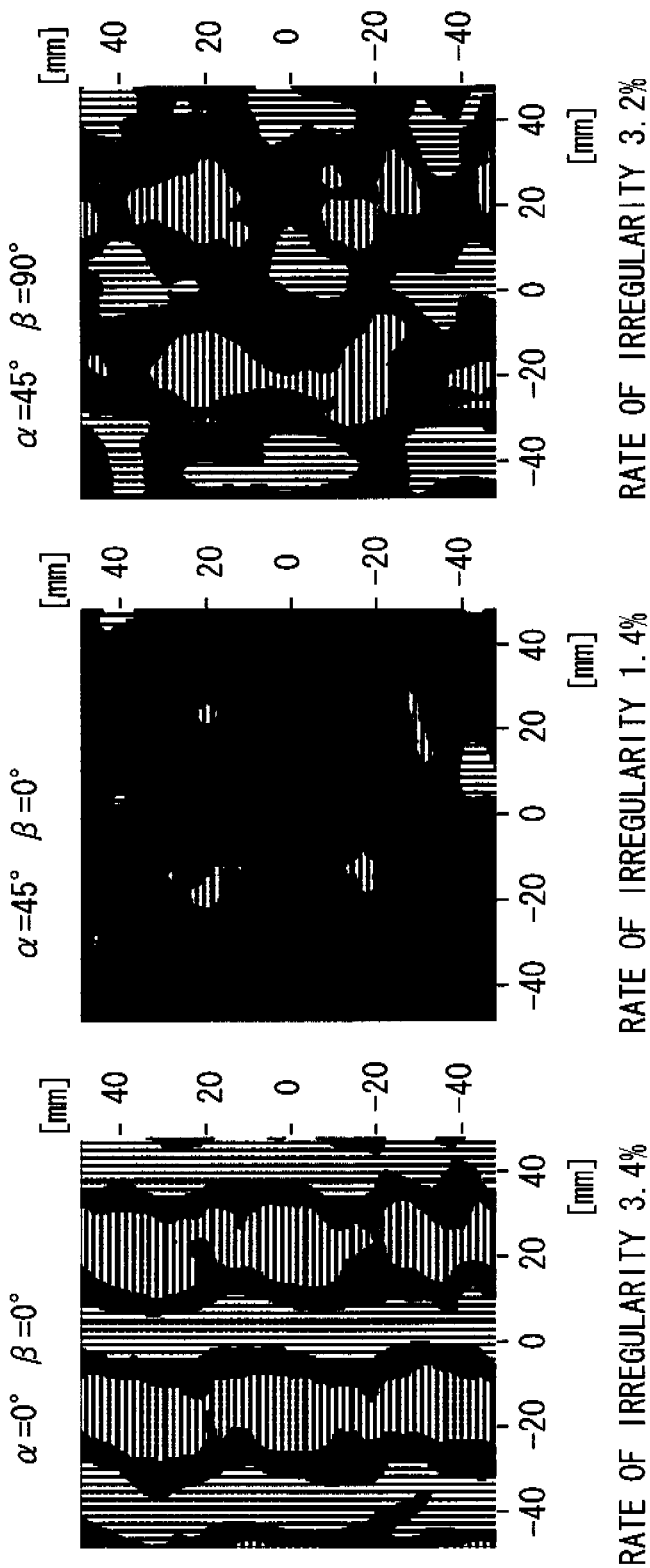
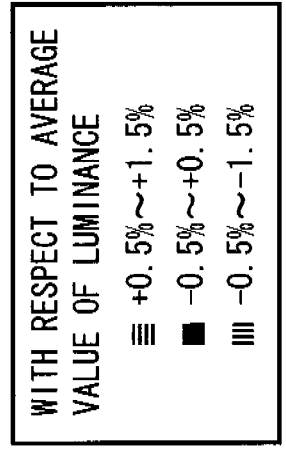
EXAMPLE 1
(ONE PIECE OF LUMINANCE ENHANCEMENT FILM)
FIG. 24A  α=0° β=0°  RATE OF IRREGULARITY 3.4%
FIG. 24B  α=45° β=0°  RATE OF IRREGULARITY 1.4%
FIG. 24C  α=45° β=90°  RATE OF IRREGULARITY 3.2%
WITH RESPECT TO AVERAGE VALUE OF LUMINANCE
+0.5%~+1.5%
-0.5%~+0.5%
-0.5%~-1.5%

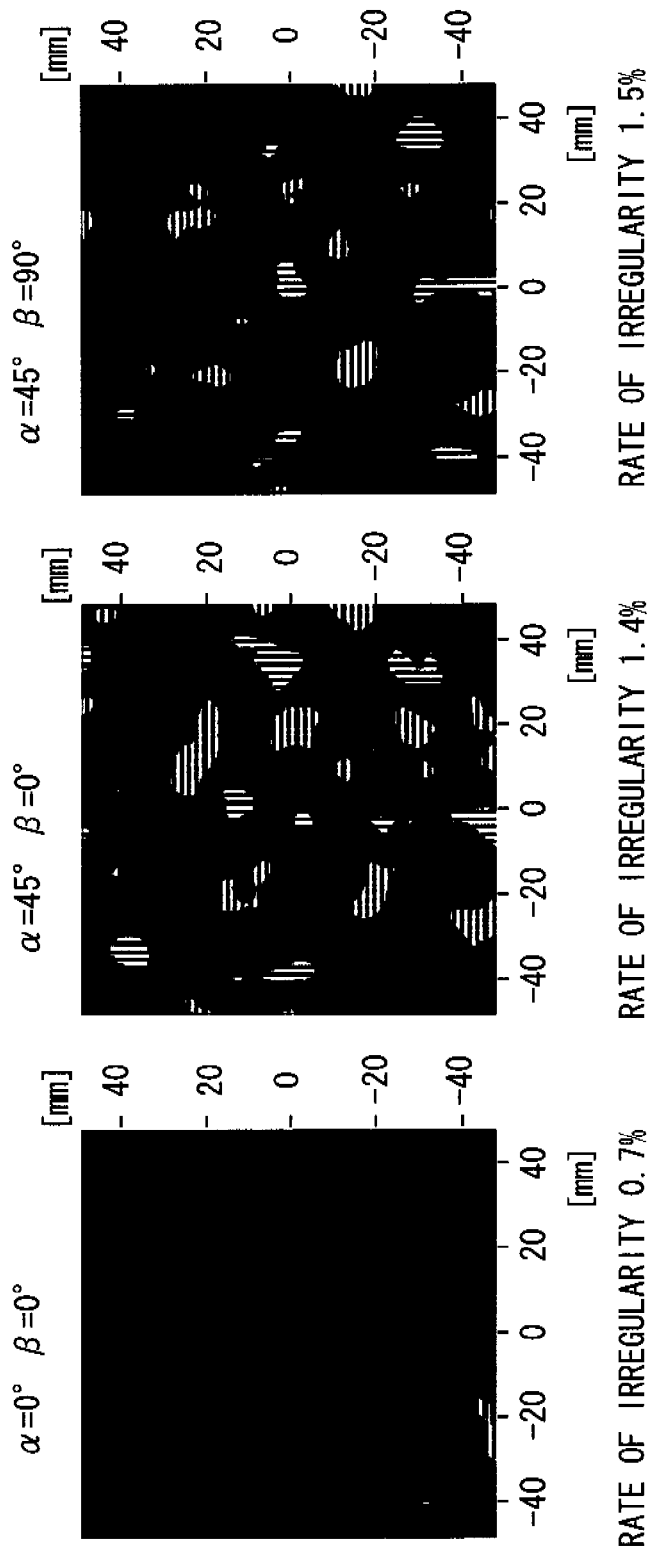
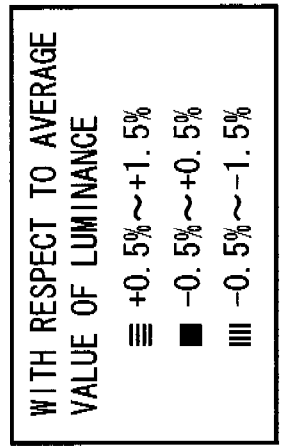
FIG. 25A  FIG. 25B  FIG. 25C

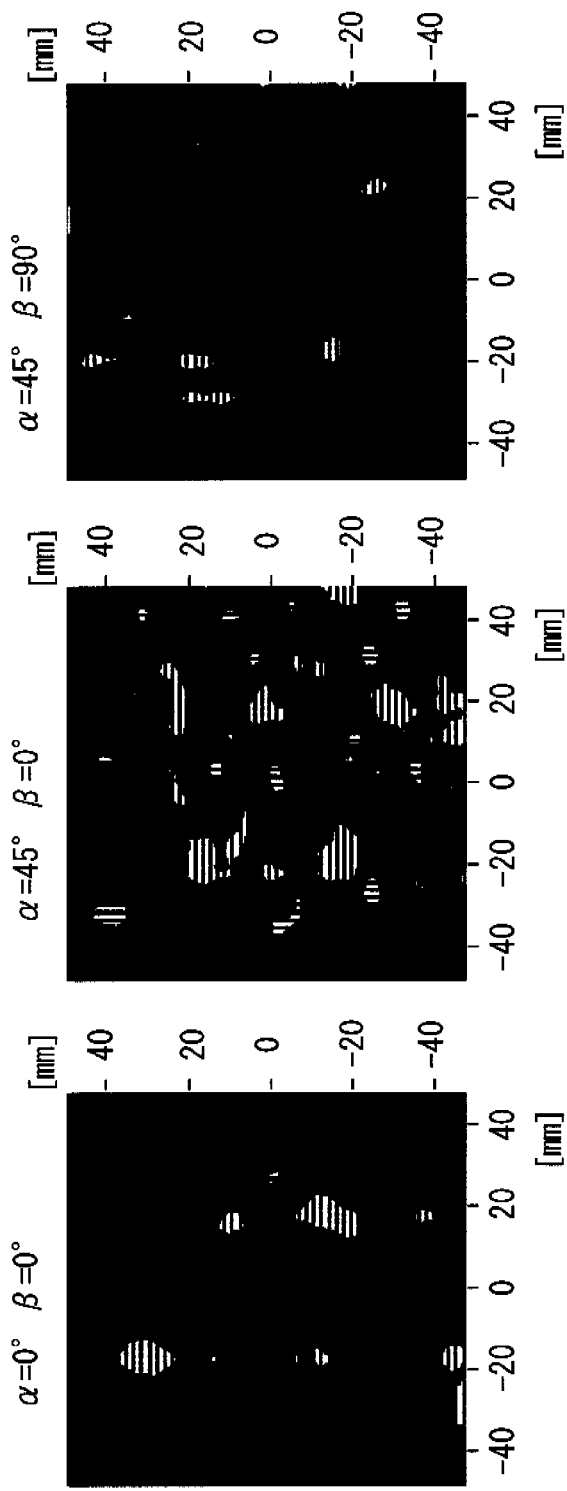
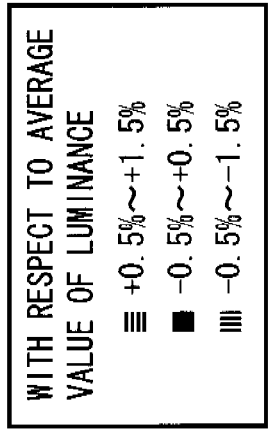
EXAMPLE 2
(TWO PIECES OF LUMINANCE ENHANCEMENT FILM)
FIG. 27A — $\alpha=0°$ $\beta=0°$ — RATE OF IRREGULARITY 1.5%
FIG. 27B — $\alpha=45°$ $\beta=0°$ — RATE OF IRREGULARITY 1.4%
FIG. 27C — $\alpha=45°$ $\beta=90°$ — RATE OF IRREGULARITY 1.2%
WITH RESPECT TO AVERAGE VALUE OF LUMINANCE
+0.5% ~ +1.5%
-0.5% ~ +0.5%
-0.5% ~ -1.5%

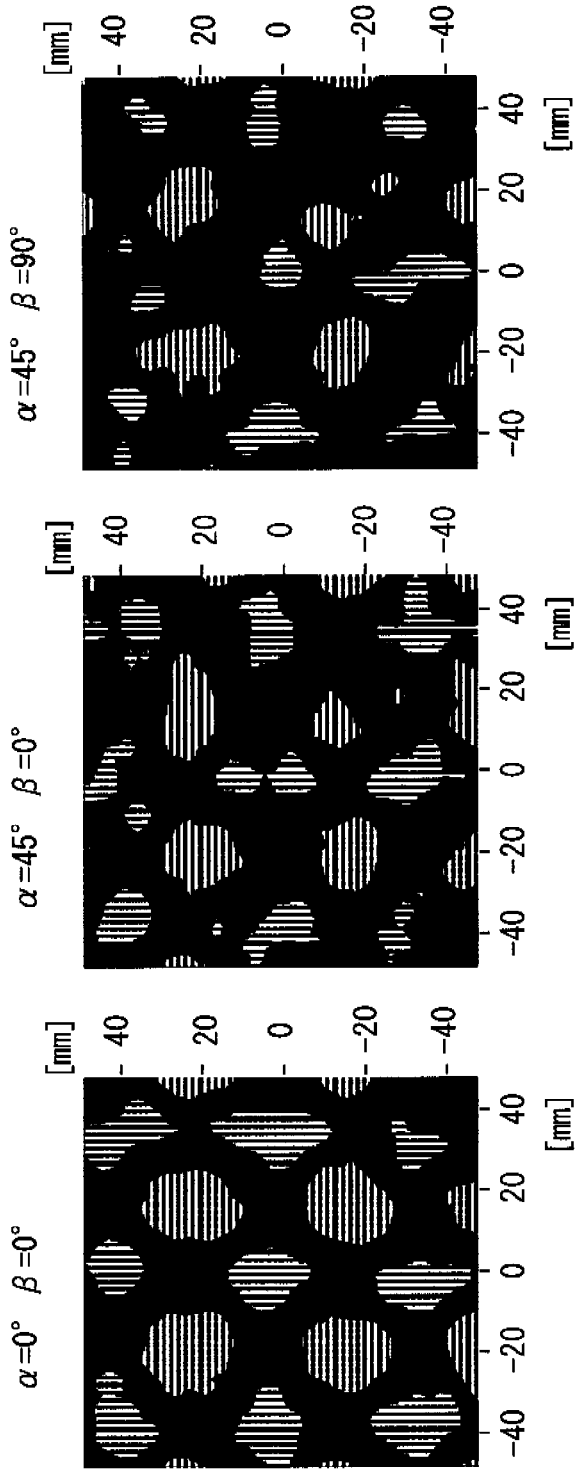
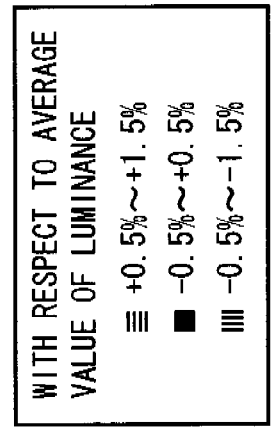
FIG. 29A RELATED ART
FIG. 29B RELATED ART
FIG. 29C RELATED ART

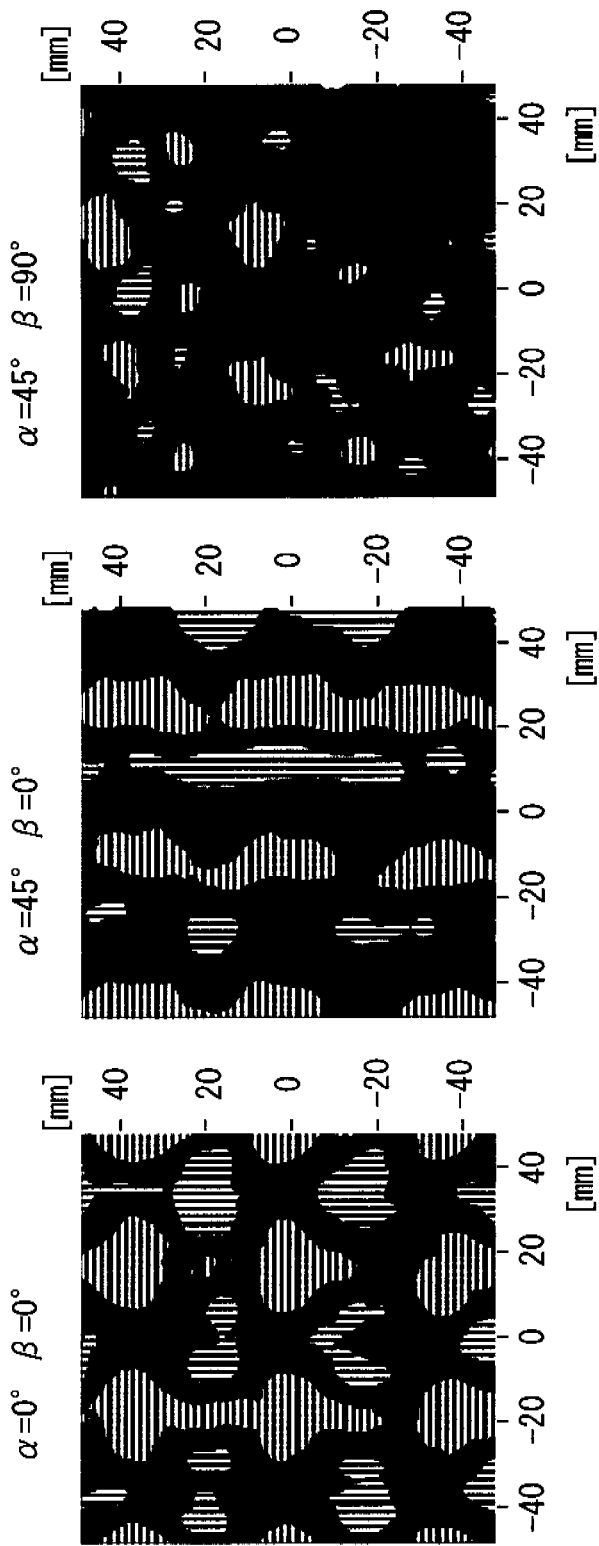
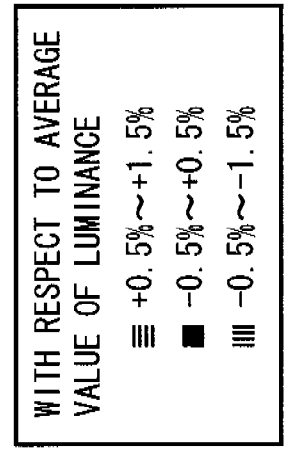
FIG. 31A RELATED ART
FIG. 31B RELATED ART
FIG. 31C RELATED ART

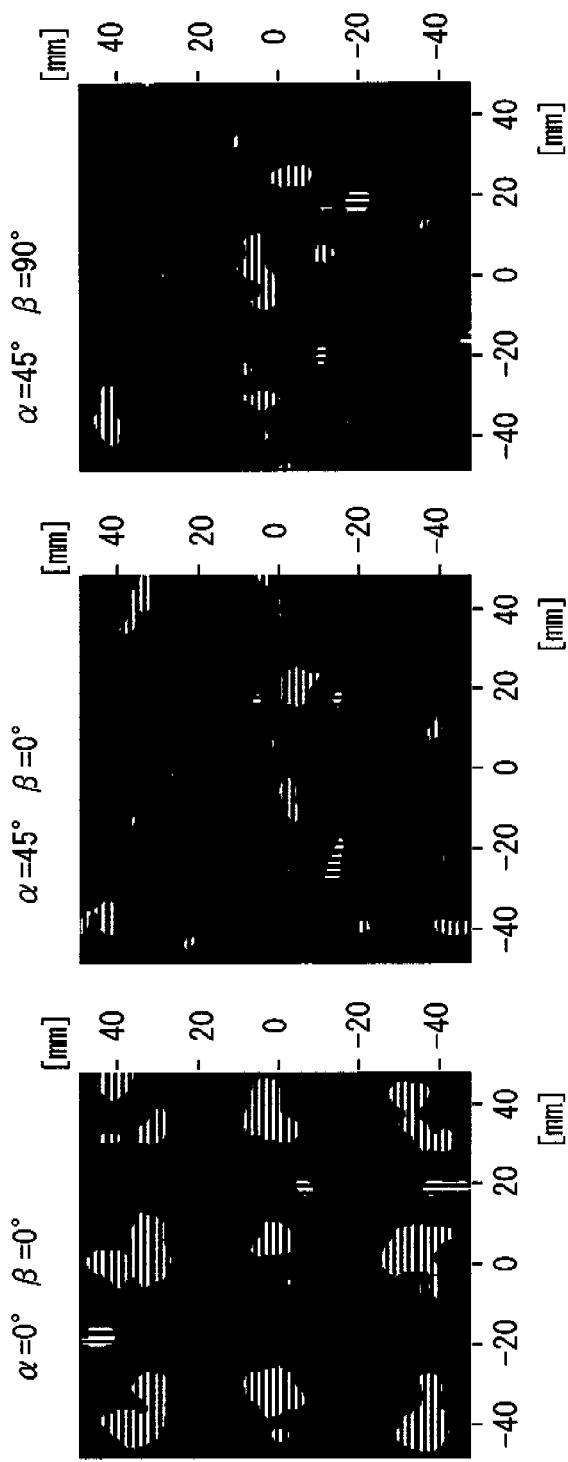
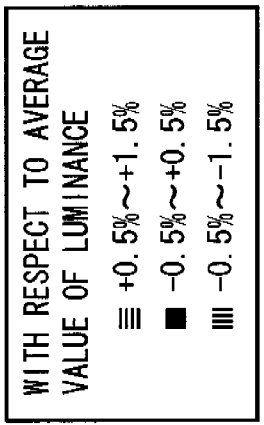
FIG. 32A RELATED ART
FIG. 32B RELATED ART
FIG. 32C RELATED ART

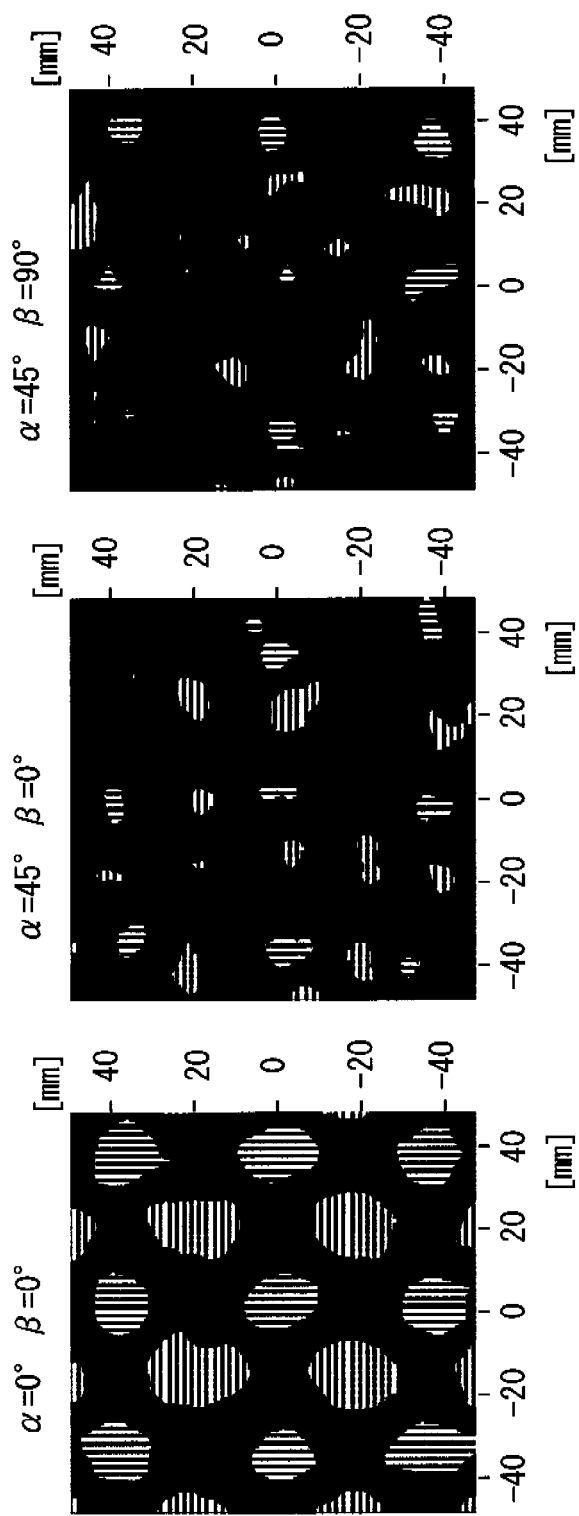
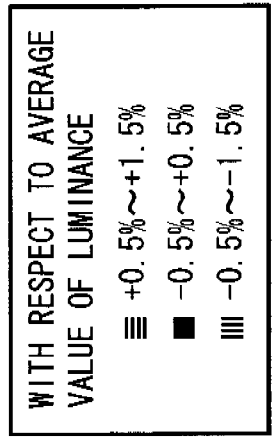
FIG. 34A RELATED ART
FIG. 34B RELATED ART
FIG. 34C RELATED ART

OPTICAL FILM, LIGHTING DEVICE AND DISPLAY UNIT

CROSS REFERENCE TO RELATED APPLICATIONS

The present application claims priority to Japanese Patent Application JP 2007-192171 filed in the Japanese Patent Office on Jul. 24, 2007, and Japanese Patent Application JP 2008-122122 filed in the Japanese Patent Office on May 8, 2008, the entire contents of which being incorporated herein by references.

BACKGROUND

The present application relates to an optical film having tridimensional configuration on the top surface thereof, and a lighting device and a display unit including the same.

Because of benefits of low power consumption, space-saving, low-pricing and so on, an LCD (Liquid Crystal Display) is recently replacing a CRT (Cathode Ray Tube), which has been the mainstream of display system heretofore.

LCD is classified into a few types according to its illuminating method for displaying images. Representative example includes a transmissive LCD, in which a backlight system for image display is employed.

It is preferable for such display units to expand the color gamut thereof. For that purpose, employment of three primary color LED (light emitting diode) of blue, green and red as a light source has been proposed instead of CCFL (cold cathode fluorescent lamp). Moreover, not only the three primary color LED but four primary color or six primary color LED is proposed to be employed for wider color gamut.

To use CCFL and LED as a light source, uniformity of the in-plane distribution of luminance and color is necessary. In the case where lighting device is relatively small, a light guide plate of sidelight backlight system may be used. However, in the case where lighting device is relatively large and large light quantity is necessary, direct-type LCD backlight system, in which light sources are disposed in a direct backside portion of panels and the like, is more dominant. It is proposed to arrange a diffusion plate containing filler in a position above the light source as one of the techniques for reducing the luminance irregularity, and color unevenness in the direct type (refer to Unexamined Japanese Patent Application Publication No. 54-155244). It is proposed, as another technique, to provide a plate of which sectional configuration is uniform in one direction. (Unexamined Japanese Patent Application Publication No. 2005-326819).

SUMMARY

In the case where the three primary color LED is employed for a light source of the lighting device, compared with the case where CCFL is employed, it is difficult to reduce the in-plane luminance irregularity and color unevenness. That is due to the fact that LED is a point light source, and that white color is produced by mixing the three colors in the case of the three primary color LED while CCFL emits a white light. For example, as for Unexamined Japanese Patent Application Publication No. 54-155244, especially when LED is used as a light source, it is necessary to have a relatively long distance from the light source to a diffusion plate. As a result, lighting device becomes thick. Meanwhile, the art proposed in Unexamined Japanese Patent Application Publication No. 2005-326819 may be effective when CCFL, which is a line light source, is used, but in the case of LED, which is a point light source, there is an issue of generation of luminance irregularity and color unevenness.

The present application has been devised in view of the above issue, and it is desirable to provide an optical film, a lighting device and a display unit using the same, in which luminance irregularity and color unevenness are reduced even in the case where a point light source is used in a thinner lighting device.

According to an embodiment, there is provided a lighting device including a plurality of point light sources arranged in plane with each other and an optical sheet arranged in a region facing the plurality of point light sources. The point light sources are arranged in a first direction and also in a second direction intersecting with the first direction. The optical sheet has a tridimensional configuration. The tridimensional configuration includes a first ridgeline extending in a third direction intersecting with the first and second directions, and a second ridgeline extending in a direction intersecting with the first, second and third directions.

According to an embodiment, there is provided a display unit including a panel driven based on an image signal, a plurality of point light sources arranged in a region facing the panel, and an optical sheet arranged between the panel and the plurality of point light sources. The plurality of point light sources are arranged in a first direction and also in a second direction intersecting with the first direction. The optical sheet has a tridimensional configuration including a first ridgeline extending in a third direction intersecting with the first and second directions, and a second ridgeline extending in a direction intersecting with the first, second and third directions.

In the lighting device and display unit of an embodiment, the optical sheet includes a tridimensional configuration in which the first and second ridgelines extend in intersecting directions with each other. With such configuration, when a light beam is emitted from each of the point light sources to the optical sheet, a light source image produced by one of the light source images is divided into plural images through the optical sheet in such a manner that spaces between the divided light source images are narrower than spaces between the respective point light sources. Here, the point light sources are arranged along directions (the first or second array direction) different from the extending directions of the ridgelines (the first or second ridgeline) of the tridimensional configuration provided on the optical sheet. With such configuration, overlapping of the divided light source images may be reduced or avoided compared with the case where the point light sources are arranged in a direction parallel to the extending directions of the ridgelines of the tridimensional configuration provided on the optical sheet.

According to an embodiment, there is provided an optical film having a rectangular shape and including a first side extending in one direction and a second side extending in a direction orthogonal to the one direction. The optical film has a tridimensional-configuration including a first ridgeline extending in a direction that intersects with extending directions of the first and second sides, respectively, and a second ridgeline extending in a direction that intersects with the extending directions of the first and second sides and extending direction of the first ridgeline.

The optical film of an embodiment includes the tridimensional configuration having the first and second ridgelines that intersect with each other. With such configuration, when the plurality of point light sources are disposed in a region facing the optical film and a light is emitted towards the optical film from the plurality of point light sources. a light source image produced by one of the point light sources is divided into plural images through the optical film so that spaces between the respective divided light source images are narrower than the spaces of the respective point light sources. Moreover. the first ridgeline intersects with the extending directions of the first and second sides respectively. and the second ridgeline intersects with the extending directions of the first and second sides and the extending direction of the first ridgeline, respectively. With such configuration, when the above-mentioned point light sources are arranged two-dimensionally along directions intersecting with the first and second ridgelines. respectively (typically, when arranged two-dimensionally along directions almost parallel to the first and second sides), overlapping of the divided light source images may be reduced or avoided compared with the case where the point light sources are arranged in the direction parallel to that of the ridgeline of the tridimensional configuration provided on the optical film.

According to the lighting device and display unit of an embodiment, since point light sources are arranged along directions (first and second array directions) different from the ridgelines (first and second ridgelines) of the tridimensional configuration provided on the optical sheet, overlapping of the divided light source images may be reduced or avoided compared with the case where the point light sources are arranged in the direction parallel to that of the ridgelines of the tridimensional configuration provided on the optical sheet. Accordingly, luminance irregularity and color unevenness may be reduced even when using the point light sources in a thinner lighting device.

In the optical film according to an embodiment. the first ridgeline extends in a direction intersecting with the extending directions of the first and second sides, respectively, and the second ridgeline extends in a direction intersecting with the extending directions of the first and second sides and the first ridgeline, respectively. With such configuration. when the plurality of point light sources are arranged two-dimensionally in a region facing the optical film in directions intersecting with the first and second ridgelines, overlap of the divided light source images may be reduced or avoided. Accordingly, luminance irregularity and color unevenness may be reduced even when using point light sources in a thinner lighting device.

Additional features and advantages are described herein., and will be apparent from the following Detailed Description and the figures.

BRIEF DESCRIPTION OF THE FIGURES

FIGS. 24A and 24C are characteristic charts showing the in-plane luminance distributions and rate of irregularity obtained by actual measurement according to Example 1, where one piece of luminance enhancement film is employed and angles of θ1 and θ2 are 25 degrees.

FIGS. 25A to 25C are characteristic charts showing the in-plane luminance distributions and rate of irregularity obtained by actual measurement according to Example 1, where two pieces of luminance enhancement films are employed and angles of θ1 and θ2 are 25 degrees.

FIGS. 27A to 27C are characteristic charts showing the in-plane luminance distributions and rate of irregularity obtained by actual measurement according to Example 2, where two pieces of luminance enhancement films are employed and angles of θ1 and θ2 are 25 degrees.

FIGS. 29A to 29C are characteristic charts showing the in-plane luminance distributions and rate of irregularity obtained by actual measurement according to Comparative Example 1, where two pieces of luminance enhancement films are employed and angles of θ1 and θ2 are 25 degrees.

FIGS. 31A to 31C are characteristic charts showing the in-plane luminance distributions and rate of irregularity obtained by actual measurement according to Comparative Example 2, where one piece of luminance enhancement film is employed and angles of θ1 and θ2 are zero degrees.

FIGS. 32A to 32C are characteristic charts shorting the in-plane luminance distributions and rate of irregularity obtained by actual measurement according to Comparative Example 2, where two pieces of luminance enhancement films are employed and angles of θ1 and θ2 are zero degrees.

FIGS. 34A to 34 C are characteristic charts showing the in-plane luminance distributions and rate of irregularity obtained by actual measurement according to Comparative Example 3. where two pieces of luminance enhancement films are employed and angles of θ1 and θ2 are 45 degrees.

DETAILED DESCRIPTION

An embodiment of the application will be described in detail hereinbelow with reference to the drawings.

First Embodiment

Figure 1:
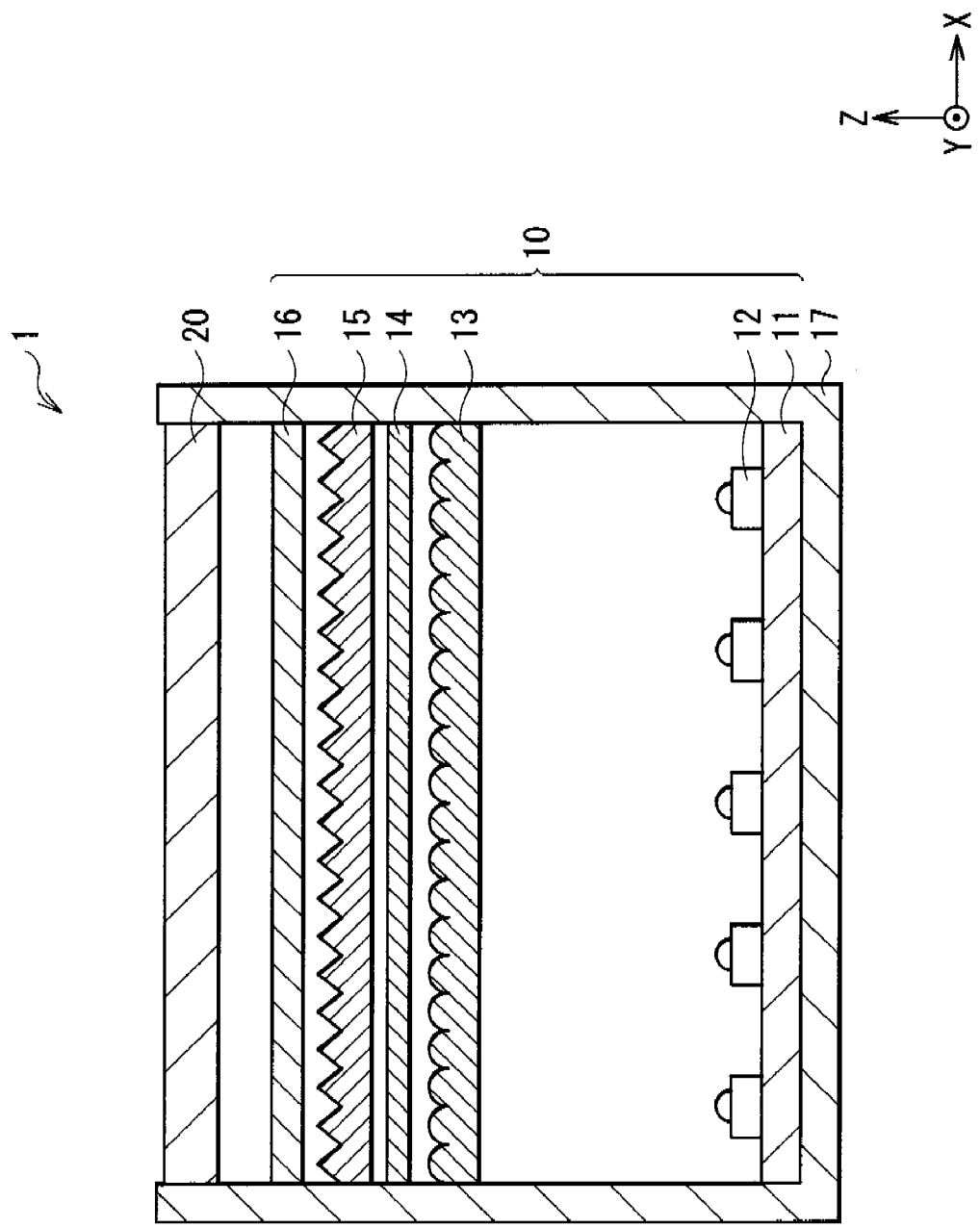
FIG. 1 is a sectional configuration view of a display unit according to a first embodiment.
Figure 2:
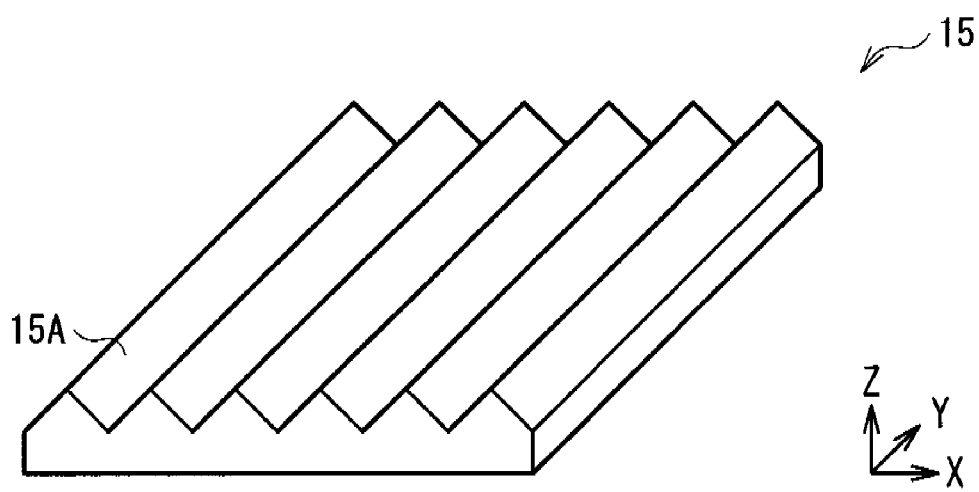
FIG. 2 is a perspective view showing an example of a luminance enhancement film of FIG. 1.

FIG. 1 shows a schematic configuration of display unit 1 according to a first embodiment. FIG. 2 is a perspective view of a principal part of the display unit 1 in FIG. 1. It is to be noted that FIGS. 1 and 2 are just typically illustrated, and are not necessarily the same with actual dimensions and configurations.

The display unit 1 includes a lighting device 10, a liquid crystal display panel 20 disposed in front of the lighting device 10, and a drive circuit (not shown) for driving the liquid crystal display panel 20 and displaying an image. In the display unit 1, the front face of the liquid crystal display panel 20 is directed to a viewer (not shown). In the present embodiment, for convenience, surface of the liquid crystal display panel 20 is considered to be orthogonal to the horizontal plane.

Liquid Crystal Display Panel 20

The liquid crystal display panel 20, although not illustrated, has a stack configuration in which a liquid crystal layer is provided between a transparent substrate on the viewer side and another transparent substrate on the lighting device 10 side. Specifically, the liquid crystal display panel 20 includes a polarizing plate, a transparent substrate, a color filter, a transparent electrode, an alignment film, a liquid crystal layer, another alignment film, a transparent pixel electrode, another transparent substrate, and another polarizing plate arranged in order from the viewer side.

The polarizing plate is a kind of an optical shutter transmitting only a vibration of light waves in a definite pattern (polarization). The two polarizing plates are arranged in such a manner that the respective polarization axes thereof are orthogonal to each other, thereby transmitting or blocking an emitting light from a light source 4 through the liquid crystal layer. The transparent substrate is a substrate transparent to visible light such as a plate glass. The active matrix drive circuit, which includes TFT (thin-film transistor) as a driving device is electrically connected to the transparent pixel electrode and wiring, etc., is disposed on one of the transparent substrates closer to the light source 4. The color filter includes color filters for separating emitting light from the light source 4 into the three primary colors of red (R) green (G) and blue (B), respectively for example. The transparent electrode is typically made of ITO (indium tin oxide) and functions as a common counterelectrode. The alignment film is typically made of polymer materials such as polyimide and performs alignment treatment on liquid crystals. The liquid crystal layer is typically made of liquid crystal of VA (Vertical Alignment) mode, TN (Twisted Nematic) mode or STN (Super Twisted Nematic) mode, and functions to transmit or block emitted lights from the light source 4 for each pixel when voltage is applied from the drive circuit. The transparent pixel electrode is typically made of ITO and functions as an electrode for each pixel.

Lighting Device 10

The lighting device 10 includes a plurality of point light sources 12. The lighting device 10 typically includes, in a space between the liquid crystal display panel 20 and the point light sources 12, a plurality of rectangular optical sheets such as a light source image segmentation sheet 13, a diffusion sheet 14, a luminance enhancement film 15, a reflective polarizing sheet 16 and so on in order from the point light sources 12, and further includes a reflection sheet 11 on the rear side of the point light sources 12. The lighting device 10 further includes a housing 17 for supporting the above-mentioned optical sheets and the liquid crystal display panel 20. Hereinbelow, explanation on the reflection sheet 11, the diffusion sheet 14. the luminance enhancement film 15 and the reflective polarizing sheet 16 will be made first and then followed by descriptions on the point light sources 12 and the light source image segmentation sheet 13.

Reflection Sheet 11

The reflection sheet 11 is typically made of foamed PET (polyethyleneterephthalate), silver deposition film or multi-layer reflection film. It functions to re-reflect lights that are partially reflected from the light source image segmentation sheet 13. the diffusion sheet 14, the luminance enhancement film 15 and the reflective polarizing sheet 16. in the direction of the liquid crystal display panel 20, thereby enabling to efficiently use the lights emitted from the point light sources 12.

Diffusion Sheet 14

The diffusion sheet 14 is a thin optical sheet which is formed bid applying transparent resin containing a light diffusion material on a relatively thin film of a transparent resin, for example. Here, examples of the transparent resin film include light transmitting thermoplastic resin such as PET, acrylic, or polycarbonate. Examples of the light diffusion material include acrylic and silicone which is globular in shape with a magnitude of about several micrometers. With such composition, the diffusion sheet 14 functions to diffuse a light source image produced by the light source image segmentation sheet 13 and to improve luminance in the front direction.

Luminance Enhancement Film 15

Figure 3:
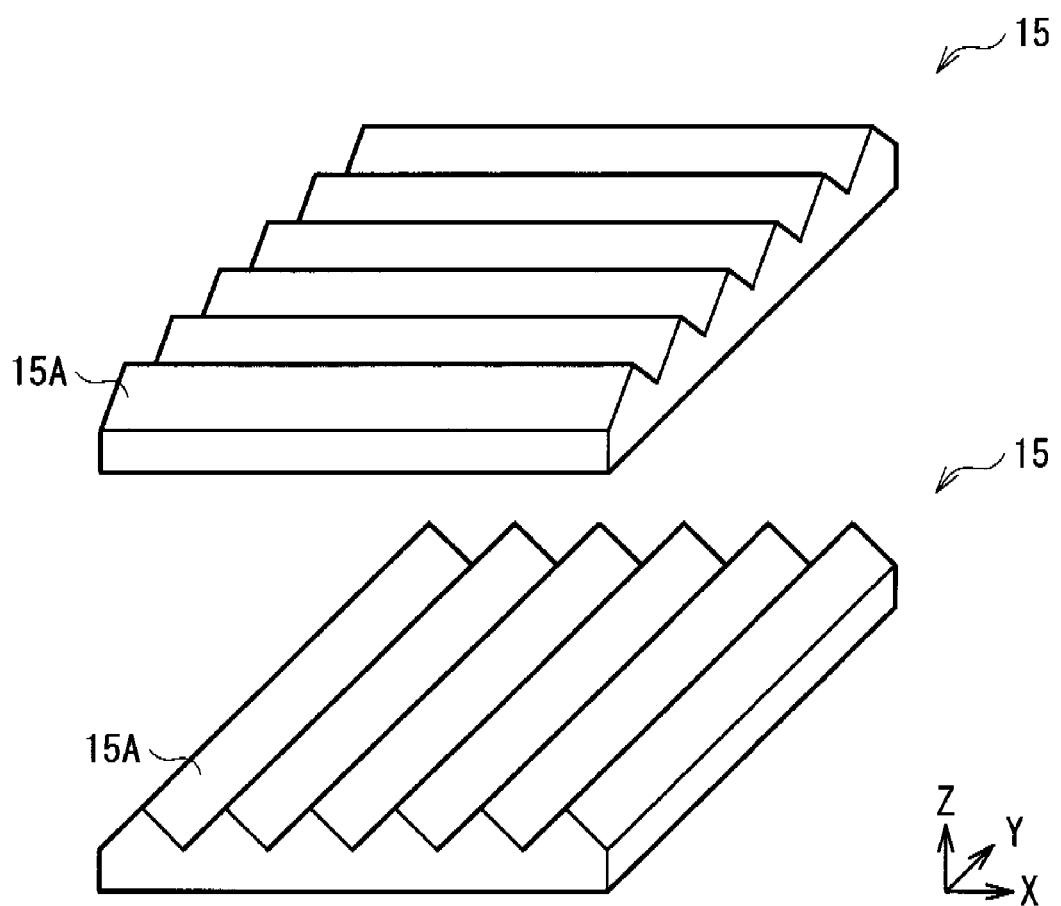
FIG. 3 is a perspective view showing another example of the luminance enhancement film of FIG. 1.

The luminance enhancement film 15 is a thin optical sheet typically including a plurality of columnar prisms 15A, which are extending along a virtual plane parallel to the bottom face of the luminance enhancement film 15 and which are continuously arranged side by, side so that the surface shape of the luminance enhancement film 15 forms a repeating pattern of columnar prisms as shown in FIG. 2. The luminance enhancement film 15 is made of a translucent resin material. With such configuration, the luminance enhancement film 15 refracts and transmits only a light component propagating in the arranging direction of the prisms 15A along the normal to the bottom face thereof, among lights entered from the bottom face thereof, thereby increasing directivity, and improving front luminance. It is also possible, for example, to dispose two pieces of the luminance enhancement films 15 in such a manner that the extending directions of the prisms 15A are orthogonal to each other as shown in FIG. 3. In addition, though the prisms 15A are triangular prisms with a sharp apex as illustrated in FIGS. 2 and 3, it is not limited to this and the apex may be round or move in a zigzag direction for example. Moreover, although FIGS. 2 and 3 illustrate a case where the prisms 15A extend in a direction intersecting with after-mentioned array directions L1, L2 of the point light sources 12 (refer to FIG. 4), they may extend in a direction parallel to the array directions L1, L2 of the point light sources 12.

Reflective Polarizing Sheet 16

The reflective polarizing sheet 16 has a multi-layered structure typically formed by alternately stacking layers each having a refractive index different from each other, and functions to polarize and split lights, of which directivity has been increased by the luminance enhancement film 15 so that only the component of light polarized along a direction of transmission axis of an incident polarizer of the liquid crystal display panel 20 is transmitted, and the component of light polarized along a direction of absorption axis of the incident polarizer of the liquid crystal display panel 20 is selectively reflected. Since the reflected light from the reflective polarizing sheet 16 is again reflected back from the reflection sheet 11 and depolarized at that time in the lighting device 10, it is recyclable.

Point Light Sources 12

Each point light source 12 is typically constituted from one or more unicolor LED's (emits only one color beams), or constituted from a plurality of three primary color LED's each emitting one red, green and blue light beams.

Figure 4:
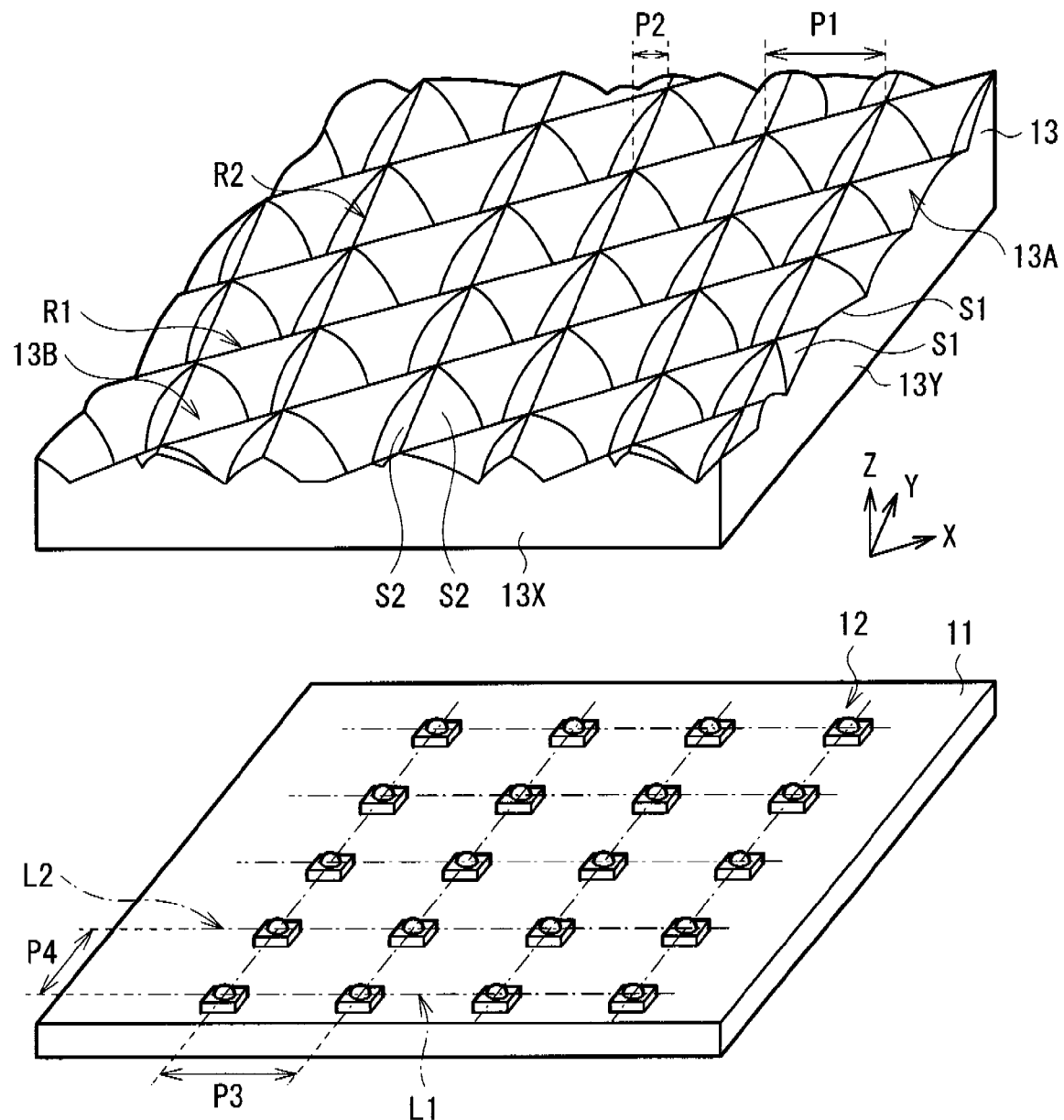
FIG. 4 is a perspective view shoring a point light source and a light source image segmentation sheet of FIG. 1.

As shown in FIG. 4, the point light sources 12 are arranged in an array. along a direction L1 (first direction) intersecting with a side 13x of the light source image segmentation sheet 13 extending in one direction (direction of the X-axis in FIG. 4) at an given angle, and also arranged in an array along a direction L2 (second direction) intersecting with a side 13y of the light source image segmentation sheet 13 extending in a direction (direction of the Y-axis in FIG. 4) orthogonal to the one direction (direction of the X-axis) at a given angle.

Here, the array directions of the point light sources 12 include the following two directions: a direction of a shortest line segment (referred to as direction A for convenience) from one of the point light sources 12 to another one which is nearest to the one point light source 12 among those disposed around the one point light source 12 (if there are two or more nearest point light sources 12 disposed around the one point light source 12. any one of them); and a direction of a shortest line segment from the one point light source 12 to another point light source 12 that is nearest to the one point light source 12 among a plurality of the point light sources 12 disposed in a direction orthogonal to the direction A as viewed from the one point light source 12.

When each point light sources 12 is constituted from a single LED emitting only one of red (R), green (G) and blue (B) light beams. or constituted from a plurality of LED's each separately emitting the three primary colors RGB, the array direction thereof is determined for each color, according to the above-mentioned rule.

It is desirable that a pitch P3 between the adjacent point light sources 12 in the direction L1 is equal to a pitch P4 between the adjacent point light sources 12 in the direction L2, but they may be different from each other.

Here, the pitch between the adjacent point light sources 12 refers to a space (distance) between the adjacent point light sources 12 disposed in the array directions. When each point light source 12 is constituted from a single LED emitting only one of red (R), green (G) and blue (B), or constituted from a plurality of LED's each separately emitting the three primary colors RGB, the pitch therebetween is determined for each color, according to the above-mentioned rule.

Light Source Image Segmentation Sheet 13

The light source image segmentation sheet 13 is tridimensionally configured in such a manner that a plurality of protrusions 13A and a plurality of protrusions 13B are alternately arranged on the upper surface thereof (on the light emitting side), as shown in FIG. 4, for example. Each of the protrusions 13A is constituted from a pair of slant-faces $S_1$ with a ridgeline R1 (a first ridgeline) in between, and each of the protrusions 13B is constituted from a pair of slant-faces $S_2$ with a ridgeline R2 (a second ridgeline) in between.

Figure 5:
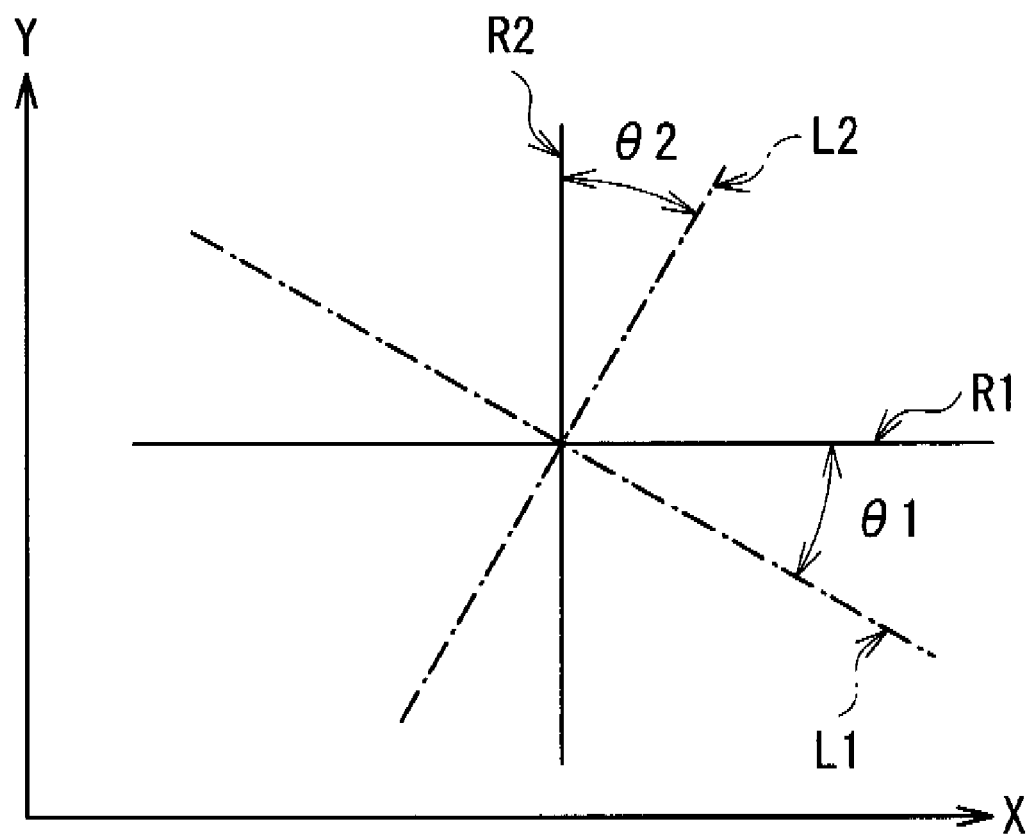
FIG. 5 is a schematic diagram for explaining the relation between the ridgelines of the light source image segmentation sheet and arrangement of the point light sources of FIG. 1.

Here, the ridgeline R1 extends in a direction which is almost parallel to the bottom face (incident side) of the light source image segmentation sheet 13 and intersecting with the array direction L1 of the point light sources 12 at a given angle θ1 (refer to FIG. 5). The ridgeline R2 extends in a direction which is almost parallel to the bottom face of the light source image segmentation sheet 13 and intersecting with the other array direction L2 of the point light sources 12 at a given angle θ2 (refer to FIG. 5). That is, the ridgelines R1 and R2 of the light source image segmentation sheet 13 are extending in directions different from the array directions L1 and L2 of the point light sources 12. Although FIG. 4 illustrates an example where the ridgelines R1 and R2 are extended in directions intersecting with the extending directions of the sides 13x and 13y of the light source image segmentation sheet 13 respectively, it is also possible that, for example, the ridgelines R1 and R2 extend in directions parallel to the extending directions of the sides 13x and 13y of the light source image segmentation sheet 13, respectively. Letting a function f(y) express a surface configuration of the protrusion 13A and a function f(x) express a surface configuration of the protrusion 13B when the x-axis is taken in the direction of the ridgeline R1 and the y-axis is taken in the direction of the ridgeline R2. the light source image segmentation sheet 13 has a surface shape satisfying the function Max [f(x), f (y)].

Here, Max [f(x), f (y)] is a function which is identical to f(x) in the case of f(x)≧f(y) and identical to f(y) in the case of f(x)<f(y).

Figure 6A:
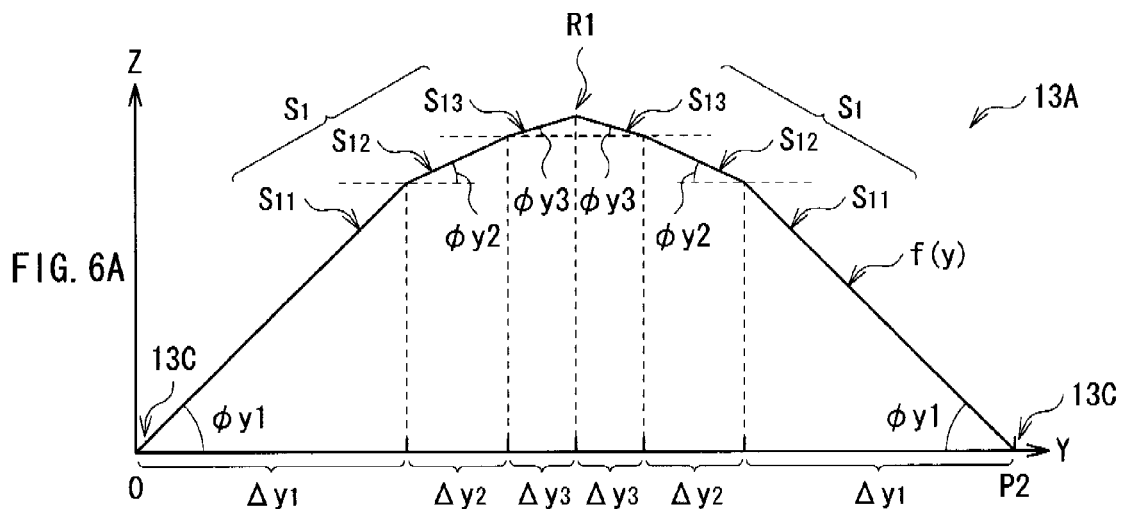
FIGS. 6A and 6B are conceptual diagrams showing example of tridimensional configuration of the light source image segmentation sheet of FIG. 1.

As shown in FIG. 6A, the surface shape of the pair of slant-faces $S_1$ are symmetrically opposed each other like an upward sloping roof toward the central ridgeline R1 to have a tridimensional configuration so that: the cross section of the protrusion 13A as cut in a direction orthogonal to the ridgeline R1 (the direction of Y-axis) may be heptagon in shape configured symmetrically with the ridgeline R1; and three kinds of inclined surfaces $S_{11}$, $S_{12}$ and $S_{13}$, which together constitute the slant-face $S_1$ and respectively have inclinations (angles between the bottom line of the protrusion 13A and the respective inclined surfaces)φy1, φy2, φy3 (where φy1>φy2>φy3), may be arranged in order from troughs 13C disposed between the adjacent protrusions 13A toward the central ridgeline R1. for example. When widths of the respective inclined surfaces $S_{11}$, $S_{12}$, and $S_{13}$, as measured in the Y-axis direction when they are projected on the bottom face of the light source image segmentation sheet 13, are denoted by $\Delta y_1$, $\Delta y_2$ and $\Delta y_3$, the optimal ratio of the widths is determined based on luminous intensity distribution of the point light sources 12. For example, when the luminous intensity of the point light sources 12 has a Lambert distribution which is typical of ordinary. LED's, a preferable ratio of the widths satisfies the relation of $\Delta y_1 > \Delta y_2 > \Delta y_3$.

Figure 7A:
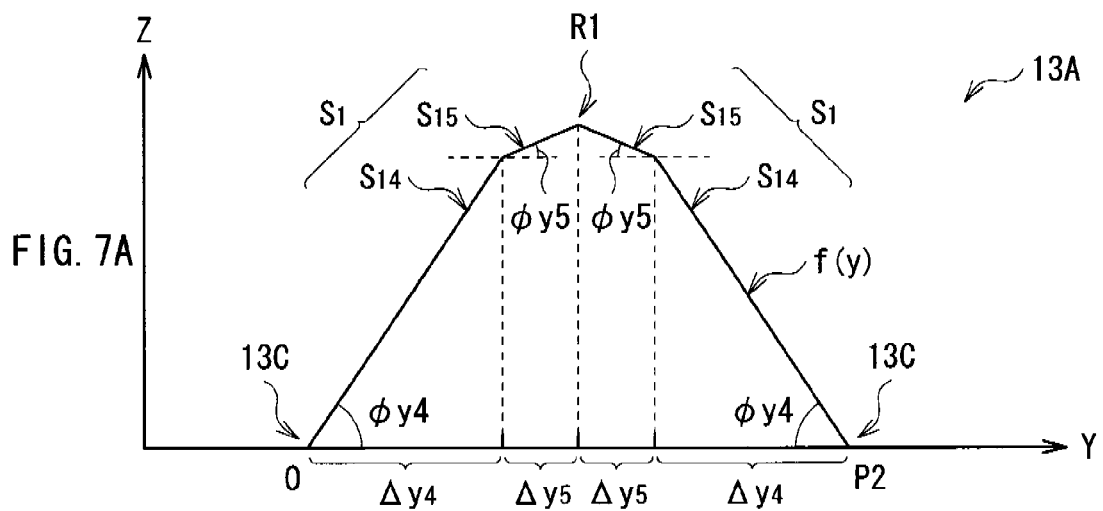
FIGS. 7A and 7B are conceptual diagrams showing another example of the tridimensional configuration of the light source image segmentation sheet of FIG. 1.

For another example, the surface shape of the pair of slant-faces $S_1$ may be configured tridimensionally in such a manner that the cross section. of the protrusion 13A as cut along a direction orthogonal to the ridgeline R1 (the direction of Y-axis) is pentagonal in shape configured symmetrically with the ridgeline R1 as shown in FIG. 7A. Here. two kinds of inclined surfaces $S_{14}$ and $S_{15}$, which together constitute the slant-face $S_1$ and respectively have inclinations (angles between the bottom line of the protrusion 13A and the respective inclined surfaces)$\phi y4$ and $\phi y5$ (where $\phi y4 > \phi y5$). may be arranged in order from troughs 13C disposed between the adjacent protrusions 13A toward the central ridgeline R1. When widths of the respective inclined surfaces S14 and S15, as measured in the Y-axis direction when they are projected on the bottom face of the light source image segmentation sheet 13, are denoted by, $\Delta y_4$ and $\Delta y_5$, the optimal ratio of the widths is determined based on the luminous intensity distribution of the point light sources 12. For example, when the luminous intensity of the point light sources 12 has a Lambert distribution which is typical of ordinary LED's, a preferable ratio of the widths satisfies the relation of $\Delta y_4 > \Delta y_5$.

It is to be noted that the heptagonal or pentagonal cross sections of the protrusion 13A are just an example, and any other configuration such as a polygon other than the heptagon and pentagon, or a combination of lines and curves is available.

Figure 6B:
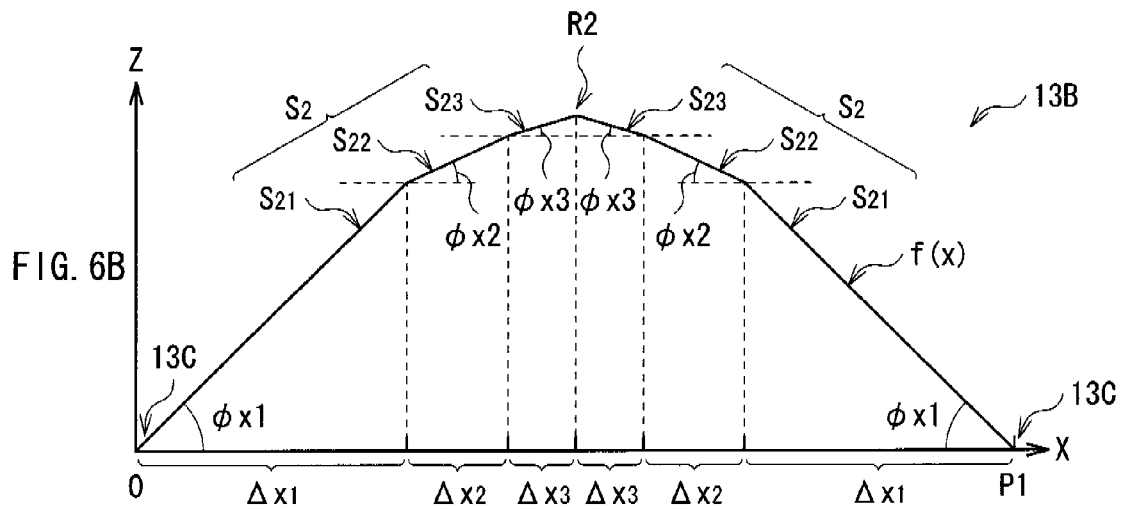

As shown in FIG. 6B, the surface shape of the pair of slant-faces $S_2$ are symmetrically opposed each other like an upward sloping roof toward the central ridgeline R2 to have a tridimensional configuration so that: the cross section of the protrusion 13B as cut along a direction orthogonal to the ridgeline R2 (the direction of X-axis) may be heptagon in shape configured symmetrically with the ridgeline R2; and three kinds of inclined surfaces $S_{21}$, $S_{22}$ and $S_{23}$, which together constitute the slant-face $S_2$ and respectively have inclinations (angles between the bottom line of the protrusion 13B and the respective inclined surfaces)$\phi x1$, $\phi x2$ and $\phi x3$ (where $\phi x1 > \phi x2 > \phi x3$), may be arranged in order from troughs 13C disposed between the adjacent protrusions 13B toward the central ridgeline R2, for example. When widths of the respective inclined surfaces $S_{21}$, $S_{22}$ and $S_{23}$, as measured in the X-axis direction when they are projected on the bottom face of the light source image segmentation sheet 13, are denoted by $\Delta x_1$, $\Delta x_2$ and $\Delta x_3$, the optimal ratio of the widths is determined based on the luminous intensity distribution of the point light sources 12. For example, when the luminous intensity of the point light sources 12 has a Lambert distribution which is typical of ordinary LED's. a preferable ratio of the widths satisfies the relation of $\Delta\Delta x_1 > \Delta x_2 > \Delta x_3$.

Figure 7B:
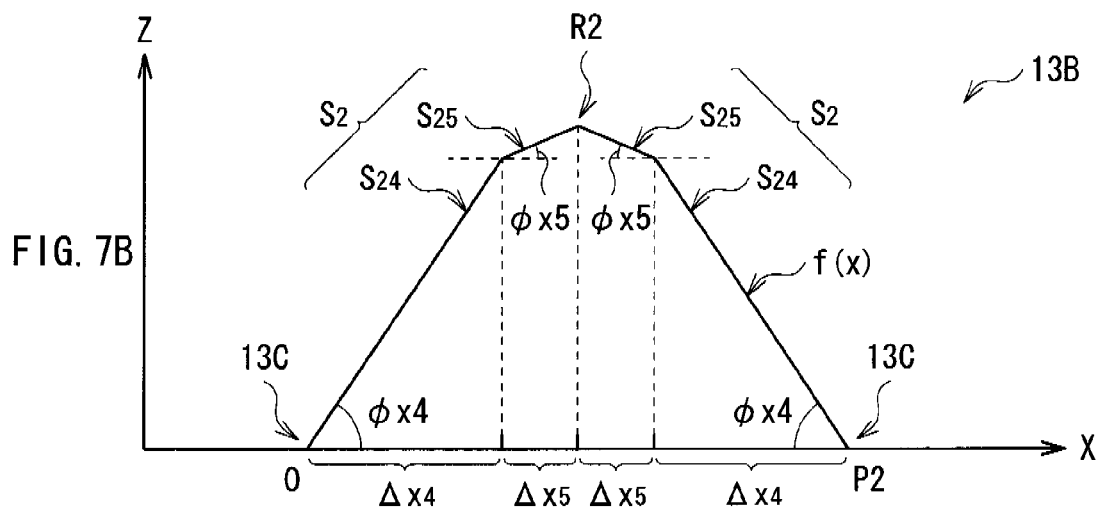

For another example, the surface shape of the pair of slant-races $S_2$ may be configured tridimensionally in such a manner that the cross section of the protrusion 13B as cut along a direction orthogonal to the ridgeline R2 (the direction of X-axis) is pentagonal in shape configured symmetrically with the ridgeline R2 as shown in FIG. 7B. Here, two kinds of inclined surfaces $S_{24}$ and $S_{25}$, which together constitute the slant-face $S_2$ and respectively have inclinations (angles between the bottom line of the protrusion 13B and the respective inclined surfaces)$\phi x4$ and $\phi x5$ (where $\phi x4 > \phi x5$), may be arranged in order from troughs 13C disposed between the adjacent protrusions 13B toward the central ridgeline R2. When widths of the respective inclined surfaces $S_{24}$ and $S_{25}$, as measured in the X-axis direction when they are projected on the bottom face of the light source image segmentation sheet 13, are denoted by $\Delta x_4$ and $\Delta x_5$, the optimal ratio of the widths is determined based on the luminous intensity distribution of the point light sources 12. For example, when the luminous intensity of the point light sources 12 has a Lambert distribution which is typical of ordinal) LED's, a preferable ratio of the widths satisfies the relation of $\Delta x_4 > \Delta x_5$.

Figure 8:
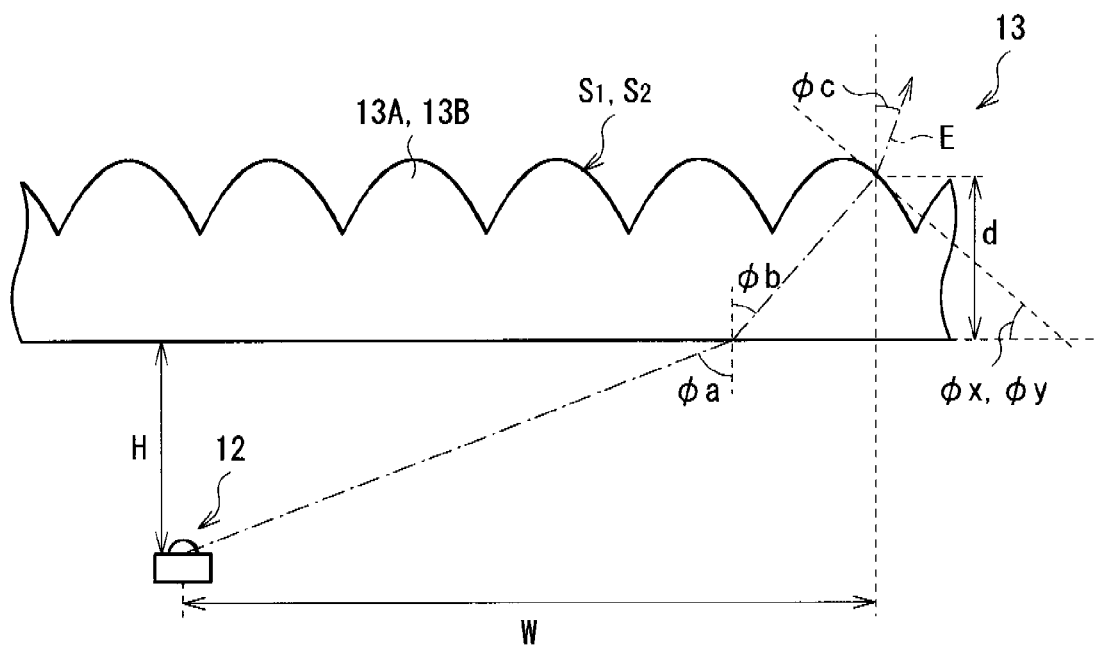
FIG. 8 is a conceptual diagram showing the operation of the light source image segmentation sheet of FIG. 1.

Here, the number of types of the inclined surfaces such as $S_{11}$ constituting the slant-faces $S_1$ and $S_2$, and the inclination for each type of the inclined surface such as $\phi x1$ are adjusted depending on how long arm lengths D1 and D2 of below-mentioned light source images I1 to I4 (refer to FIG. 10) shall be set. This is understood from the fact that, as shown in FIG. 8, larger transmission angle $\theta c$ (angle between a light beam E transmitted from the transmission surface of the light source image segmentation sheet 13 and the normal to the bottom face thereof) will increase a distance between the point light source 12 and location of the light source image. Actually, however, the transmission angle $\theta c$ depends not only on the above-mentioned number of types of the inclined surface such as $S_{11}$ and their inclinations such as $\phi x1$, but depends on other various factors such as distance H from the point light source 12 to the light source image segmentation sheet 13, the distance W between the point light sources 12 and a hypothetical line extended downward vertically from the transmission point of the light beam E, the refractive index of the light source image segmentation sheet 13, the refractive index of a medium disposed between the light source image segmentation sheet 13 and the point light source 12, and the refractive index of a medium around the emitting point of the light beam E. Accordingly, the arm lengths D1 and D2 are determined in view of all the above.

Figure 9:
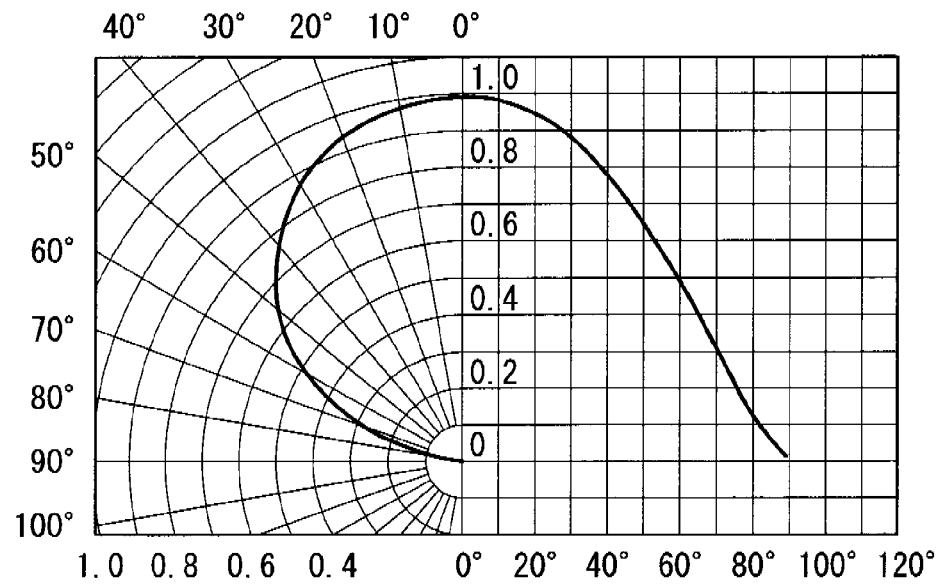
FIG. 9 is a characteristic chart showing an example of optical properties of the point light sources of FIG. 1.

With such configuration. for example, the light source image segmentation sheet 13 refracts and transmits a light entered into the bottom face or the slant-faces $S_1$, $S_2$ at an angle equal to or smaller than the critical angle, among lights emitted from the point light sources 12, and reflects all the other lights entered at an angle larger than the critical angle. Accordingly, it functions to divide a light source image produced by each of the point light sources 12 into several images according to the number of types of the inclined surfaces such as $S_{11}$ constituting the slant-faces $S_1$ and $S_2$. That is, when a light having such optical properties as shown in FIG. 9 is emitted for example from each of the point light sources 12 toward the light source image segmentation sheet 13. the light source image segmentation sheet 13 divides the light source image (not shown) produced by each of the point light sources 12 into several images as exemplified in FIGS. 10, 12 and 13 (will be described in full detail later) in such a manner that spaces (D4 to D7) in figures. for example) between the divided light source images I1 to I4 are narrower than pitches (P3 and P4) between the adjacent point light sources 12. In this manner, a difference between the maximum luminance level of the light source images I1 to I4 after the division and the minimum luminance level of the spaces (dark portions) between the light source images I1 to I4 after the division may be reduced compared with a difference between the maximum luminance level of the light source images before the division and the minimum luminance level of the spaces between the light source images, thereby reducing illumination luminance irregularity. Accordingly, the light source image segmentation sheet 13 is a kind of diffusion plate as well.

It is to be noted that the light source image is a luminous flux indicating a peak luminance value in the luminance distribution of lights, while the space between the light source images is an in-plane distance between adjacent peaks of luminous flux in the luminance distribution.

The light source image segmentation sheet 13 may be integrally made of a translucent resin material such as a thermoplastic resin, or may be formed by transferring an energy-ray (such as ultraviolet rays) hardening resin on a translucent base material such as PET (polyethyleneterephthalate).

Figure 10:
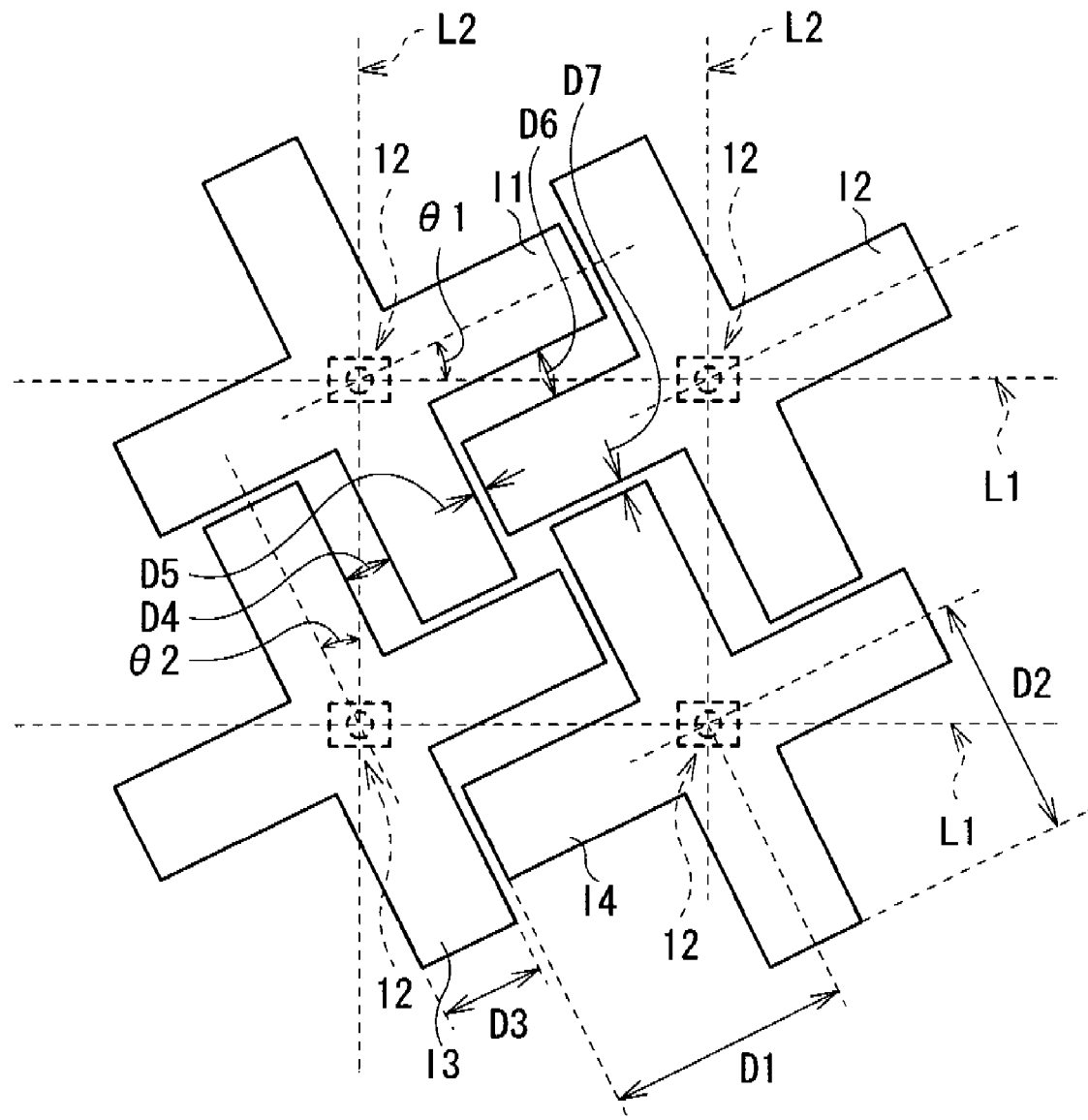
FIG. 10 is a conceptual diagram showing an example of operation of the light source image segmentation sheet of FIG. 1.
Figure 12:
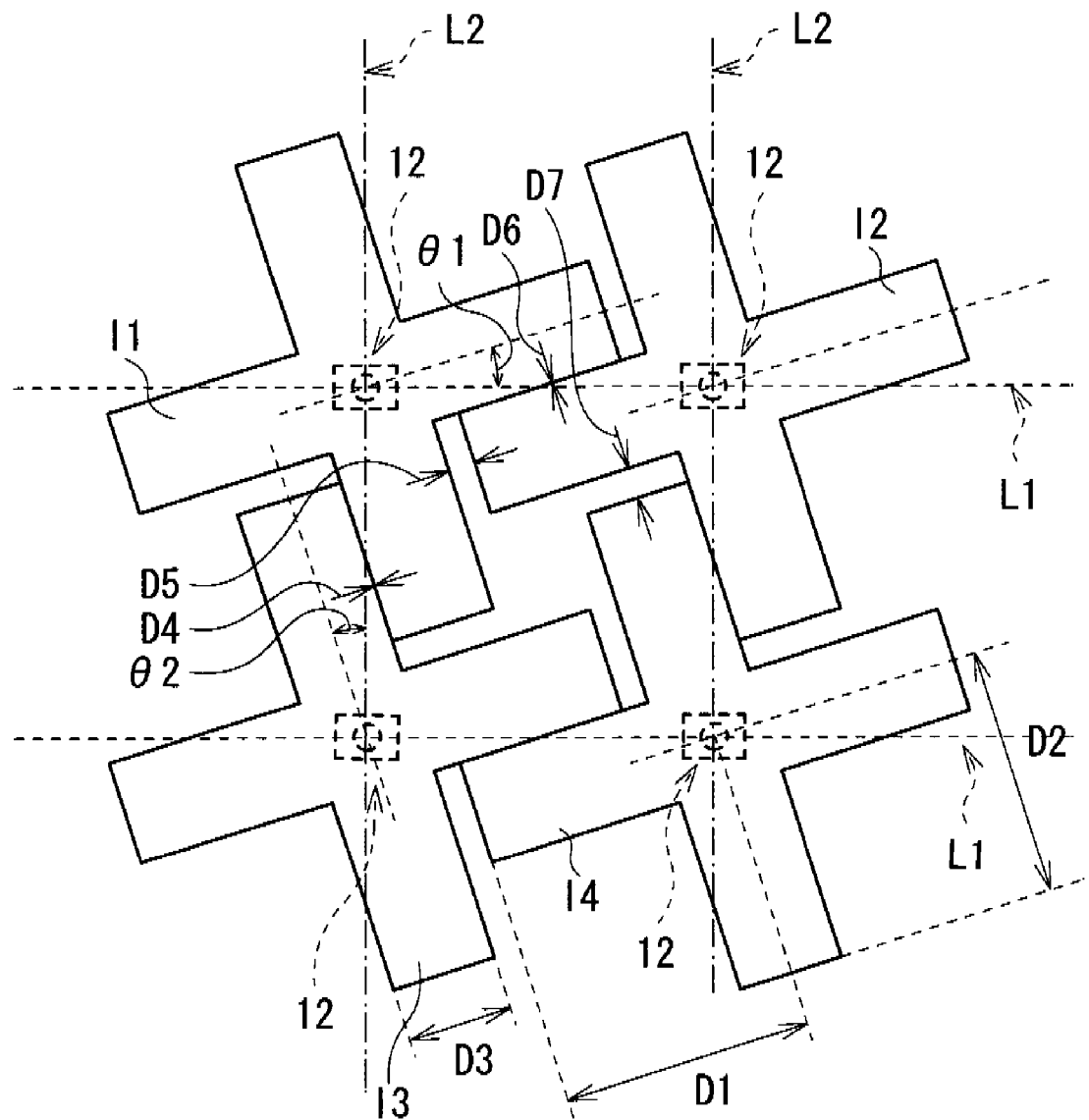
FIG. 12 is a conceptual diagram showing another example of operation of the light source image segmentation sheet of FIG. 1.
Figure 13:
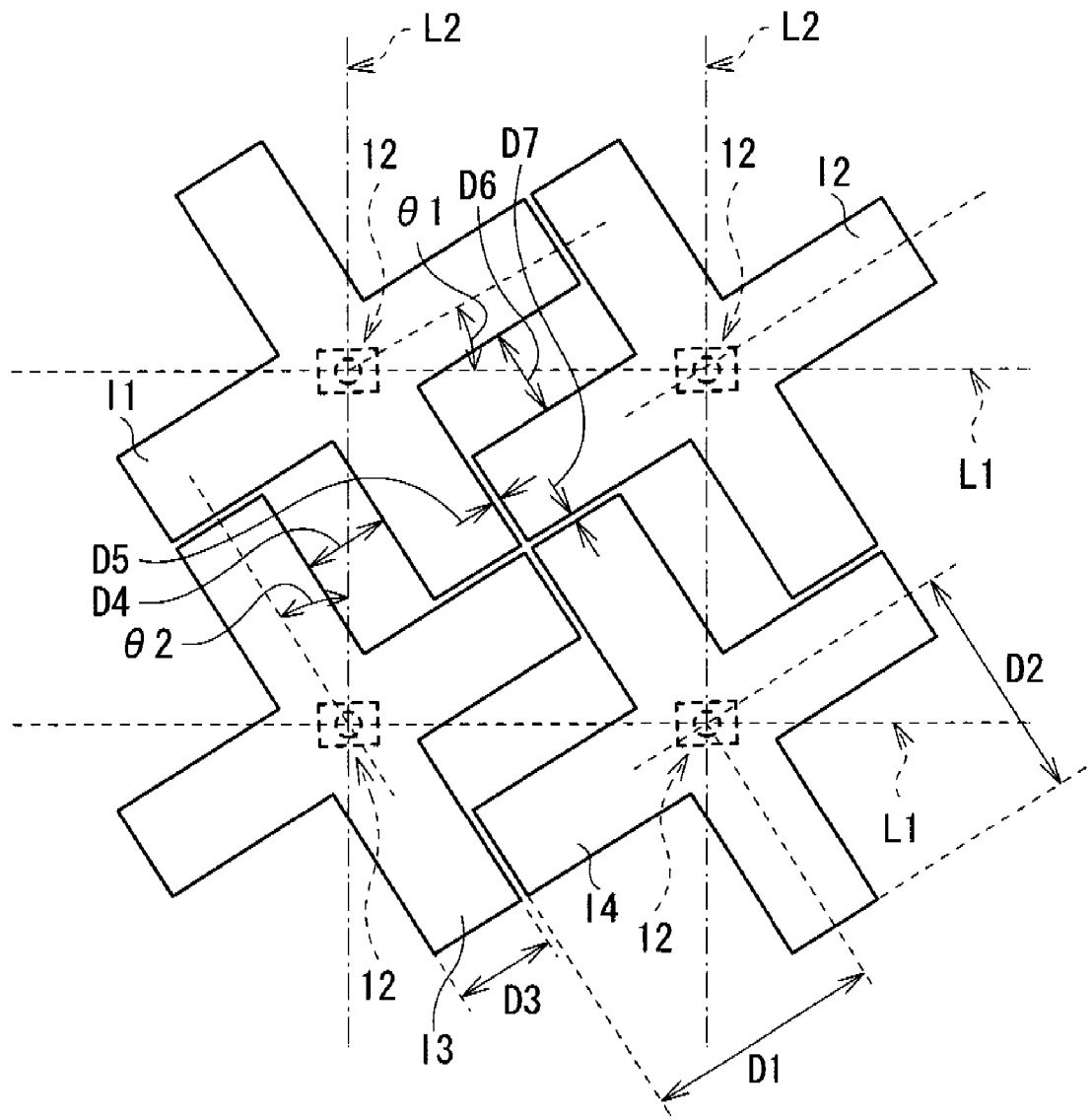
FIG. 13 is a s a conceptual diagram showing another example of operation of the light source image segmentation sheet of FIG. 1.

As exemplified by FIG. 10, FIG. 12, and FIG. 13, the light source image segmentation sheet 13 forms X-shaped (crossbar-shaped) light source images I1 to I4 by dividing an original light source image produced by the light source 12 into several images. Configuration and arm width D3 of the light source images I1 to I4 do not van, depending on the in-plane arrangement manner of the point light sources 12 but are determined based on the tridimensional configuration of the light source image segmentation sheet 13.

Figure 14:
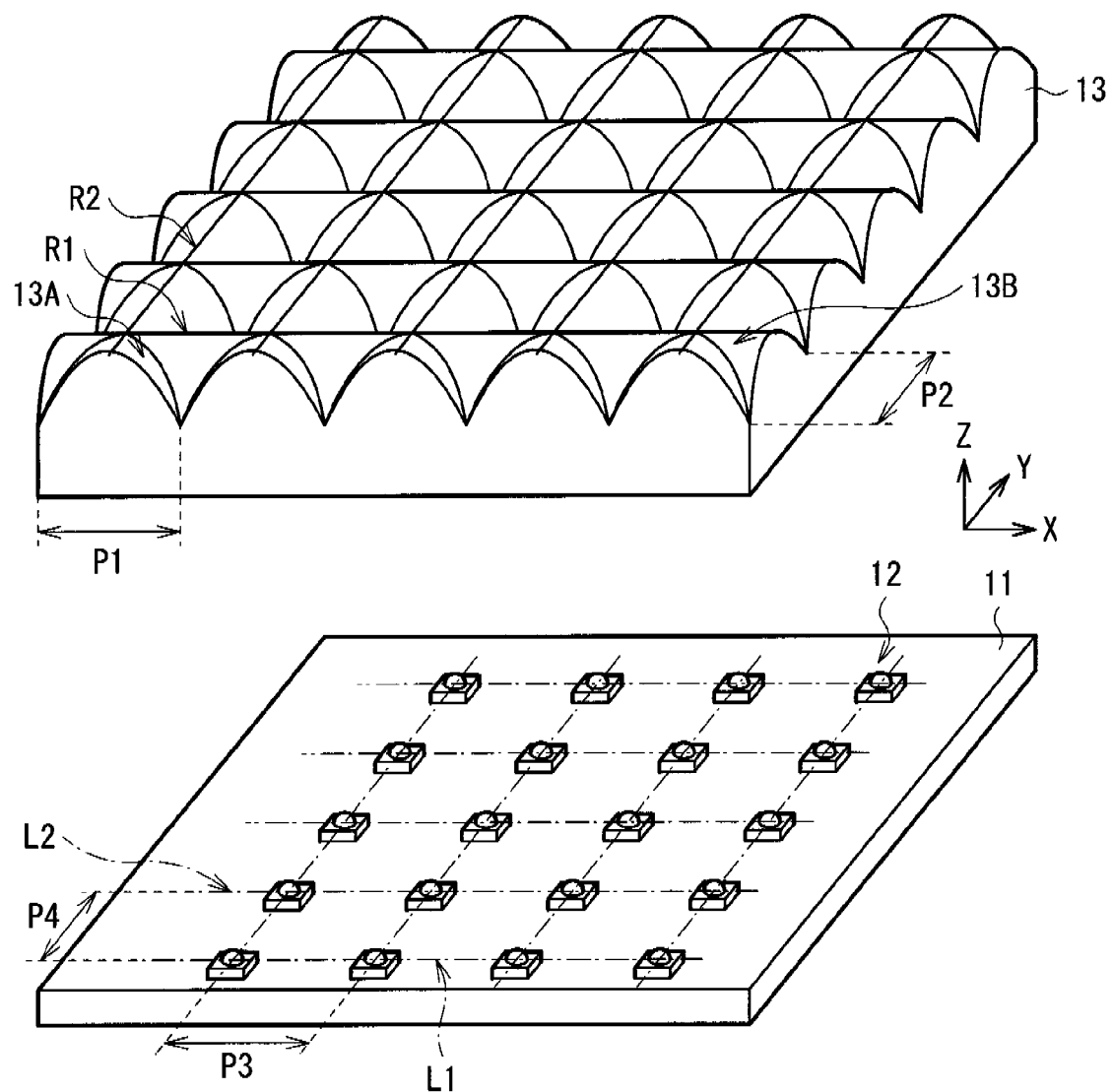
FIG. 14 is a perspective view showing an enlarged principal part of a display unit according to a comparative example.
Figure 15:
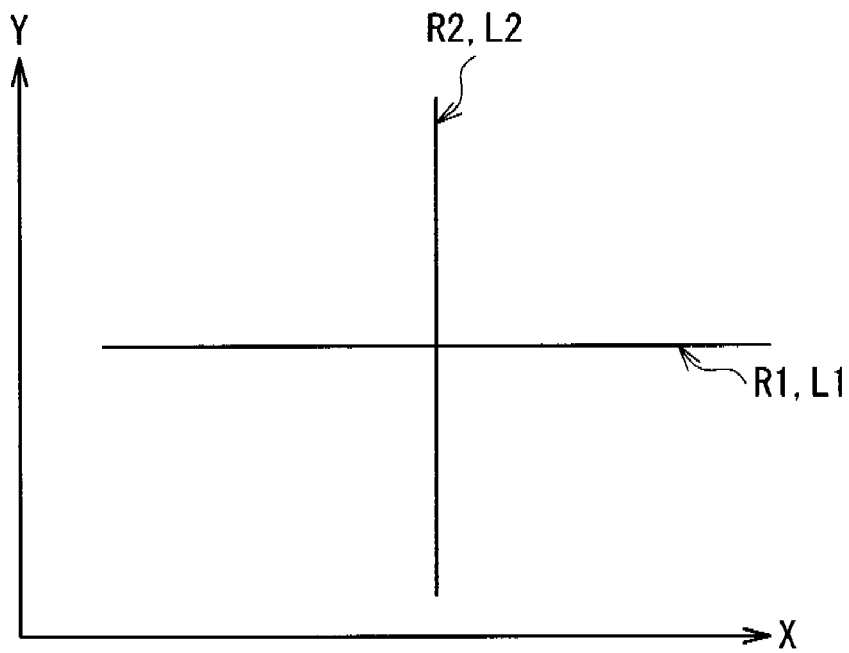
FIG. 15 is a schematic diagram for explaining the relation between the ridgeline of the light source image segmentation sheet of FIG. 14 and arrangement of the point light sources.

Thereby, as shown in FIGS. 14 and 15 for example, even when the ridgeline R1 of the light source image segmentation sheet 13 extends in a direction parallel to L1, which is one of the array directions of the point light sources 12, and the ridgeline R2 of the light source image segmentation sheet 13 extends in a direction parallel to L2. which is the other array direction of the point light sources 12. the light source images are also formed in X-letter shape (crossbar shape).

Figure 16:
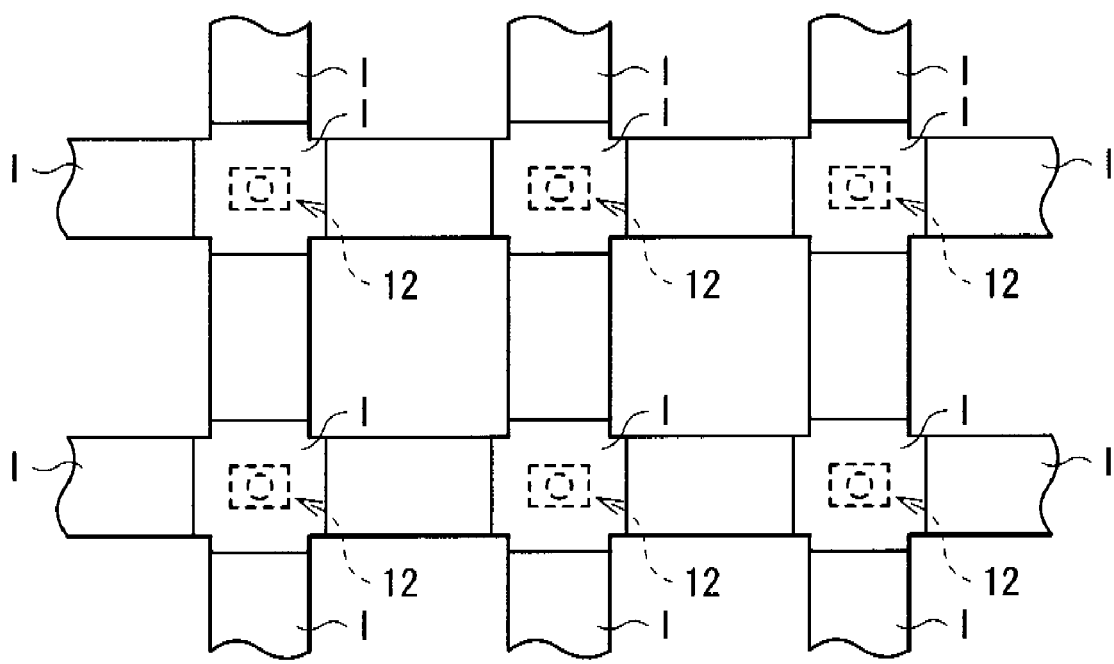
FIG. 16 is a conceptual diagram showing an operation of the light source image segmentation sheet of FIG. 14.
Figure 17:
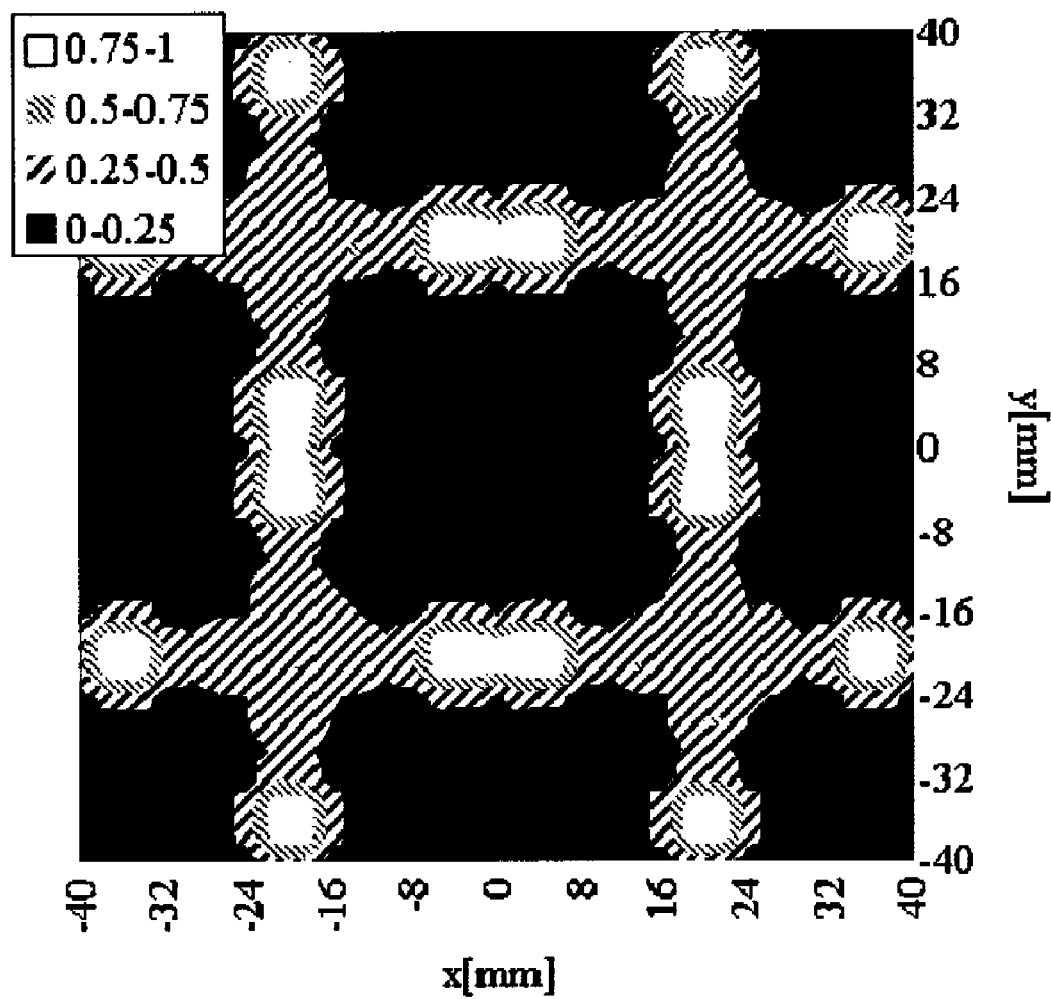
FIG. 17 is a characteristic chart showing the optical properties of the light source image segmentation sheet of FIG. 16, computed in a simulation model.

However, when the respective point light sources 12 are arranged two-dimensionally along the ridgelines R1 and R2 of the light source image segmentation sheet 13, the arms of the adjoining light source images I1 to I4 will overlap mutually, as shown in FIG. 16. FIG. 17 shows a result of in-plane luminance distribution computed using a simulated light. Here, fields of the maximum luminance is set to 1, and fields of the lowest luminance is set to 0. According to this, the mutually overlapping portions become bright notably compared with other portions, thereby efficient reduction of luminance irregularity is unavailable.

Meanwhile, in the present embodiment, the ridgeline R1 of the light source image segmentation sheet 13 extends in a direction intersecting with L1, which is one of the array directions of the point light sources 12, at a given angle $\theta 1$ (refer to FIG. 5), and the ridgeline R2 of the light source image segmentation sheet 13 extends in a direction intersecting with L2, which is the other array direction L2 of the point light sources 12, at a given angle $\theta 2$ (refer to FIG. 5). In this manner, overlapping portions between the divided light source images can be reduced or even eliminated compared with the case where the ridgelines R1 and R2 of the light source image segmentation sheet 13 extend in the direction parallel to the array directions L1 and L2 of the point light sources 12, respectively. As a result, reduction of luminance irregularity is available.

In the present embodiment, the ridgeline R1 extends in a direction simultaneously intersecting with three directions including L1 and L2, which are the array directions of the point light source 12, and the extending direction of the ridgeline R2 of the tridimensionally configured light source image segmentation sheet 13, respectively as shown in FIGS. 4 and 5. The ridgeline R2 extends in a direction simultaneously intersecting with three directions including the array directions L1 and L2 of the point light source 12, and the extending direction of the ridgeline R1 of the tridimensionally configured light source image segmentation sheet 13, respectively. Then, letting the angle between the ridgeline R1 and the array direction L1 be $\theta 1$, the angle between the ridgeline R2 and the array direction L2 be $\theta 2$, it is desirable that the ridgelines R1 and R2 of the light source image segmentation sheet 13 be defined so that the rotation angles $\theta 1$ and $\theta 2$ respectively satisfy, the following inequalities simultaneously:

$$10°<\theta 1<40°$$

$$10°<\theta 2<40°$$

When the array directions L1 and L2 are orthogonal or nearly orthogonal to each other, it is more desirable that the rotation angles $\theta 1$ and $\theta 2$ satisfy the following equality:

$$\theta 1=\theta 2=25°$$

Here, when the ridgeline R1 and R2 of the light source image segmentation sheet 13 are defined so that the angles of $\theta 1$ and $\theta 2$ become 25 degrees, the spaces of the light source images I1 to I4 (D4, D5, D6, D7) become almost the same as shown in FIG. 10. With such configuration, uniformity, in in-plane distribution of the spaces (dark portions) between the light source images I1 to I4 is available, thereby remarkably reducing luminance irregularity.

It is to be noted that D4 is a distance between sides of arms of the light source images I1 and I3 in the extending direction of the ridgeline R1, and D5 is a distance between an end portion of an arm of the light source image I2 and the side of the light source image I1 in the extending direction of the ridgeline R1. D6 is a distance between sides of arms of the light source images I1 and I2 in the extending direction of the ridgeline R2, and D7 is a distance between an end portion of an arm of the light source image I4 and the side of the arm of the light source image I in the extending direction of the ridgeline R2.

Figure 11:
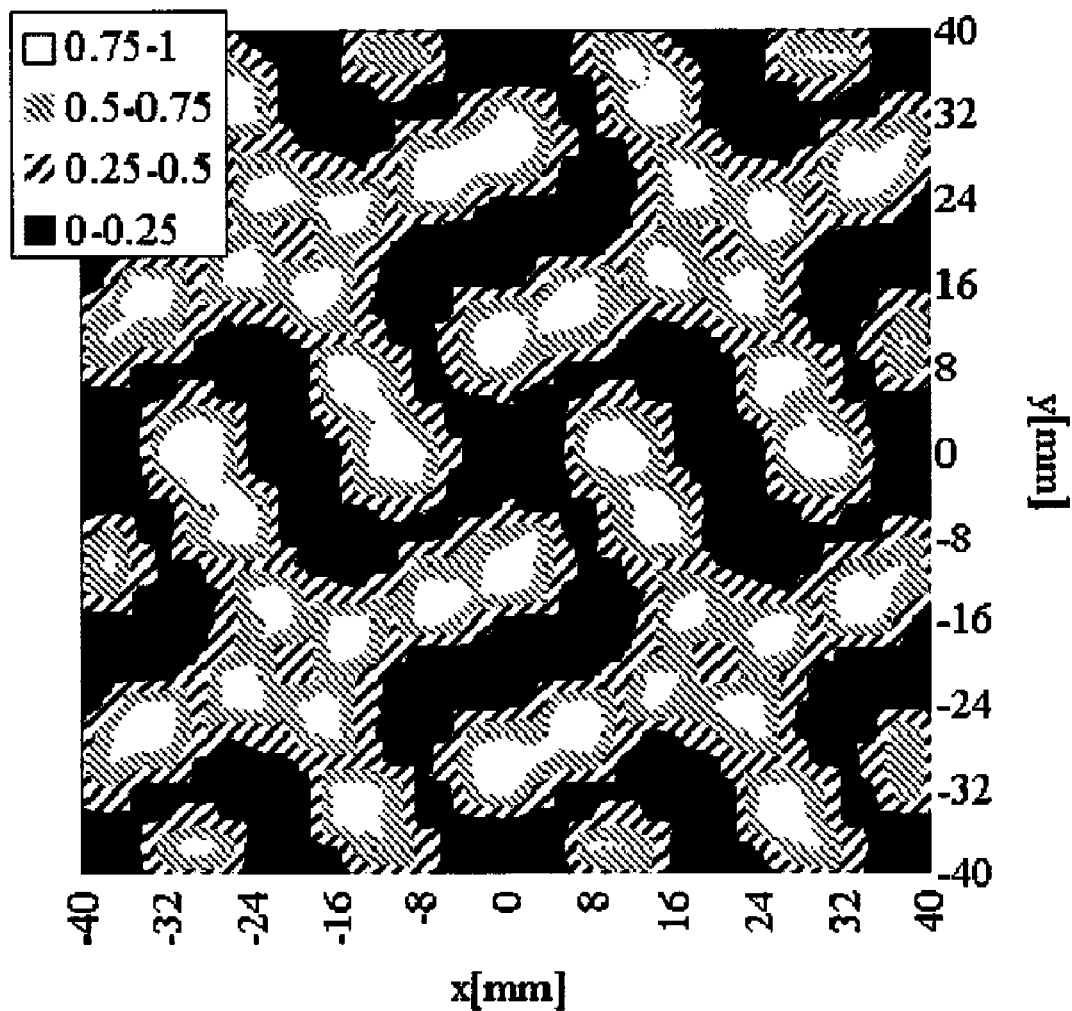
FIG. 11 is a characteristic chart shoring the optical properties of the light source image segmentation sheet of FIG. 10, computed in a simulation model.

FIG. 11 shows a result of in-plane luminance distribution when the ridgelines R1 and R2 of the light source image segmentation sheet 13 are defined so that the rotation angles $\theta 1$ and $\theta 2$ may be 25 degrees, which is computed using a simulated light beam. Here, fields of the maximum luminance are set to 1, and fields of the minimum luminance are set to 0. According to FIG. 11, luminance distribution produced by any one of the point light sources does not overlap with luminance distribution of the other light sources. thereby remarkably reducing luminance irregularity.

When the ridgelines R1 and R2 of the light source image segmentation sheet 13 are defined so that the angles $\theta 1$ and $\theta 2$ may be larger than 10 degrees, which is the lower limit angle available, and smaller than 40 degrees, which is the upper limit angle available, overlapping of the light source images I1 to I4 are avoidable as shown in FIG. 12 (when $\theta 1$ and $\theta 2$ are around the lower limit of 10 degrees) and FIG. 13 (when $\theta 1$ and $\theta 2$ are around the upper limit of 40 degrees), thereby reducing luminance irregularity.

When arm lengths D1 and D2 of the light source images I1 to I4 are shorter than those shown in FIG. 10, FIG. 12 and FIG. 13, the lower limit of $\theta 1$ and $\theta 2$ may be set smaller than the above-mentioned lower limit of 10 degrees, or may be set larger than the above-mentioned upper limit of 40 degrees. However. in this case, the distances (dark portions) between the respective light source images I1 to I4 increase, thereby decreasing the luminance-irregularity-reducing effectiveness. Accordingly. it is desirable that the inclinations such as $\phi x1$ of the inclined surfaces such as $S_{11}$, which constitute the slant-faces $S_1$ and $S_2$ of the light source image segmentation sheet 13, are set suitably so that the arm lengths D1 and D2 of the respective light source images I1 to I4 may satisfy the following expressions:

$$D1 \geq P3/2$$

$$D2 \geq P4/2$$

Figure 18:
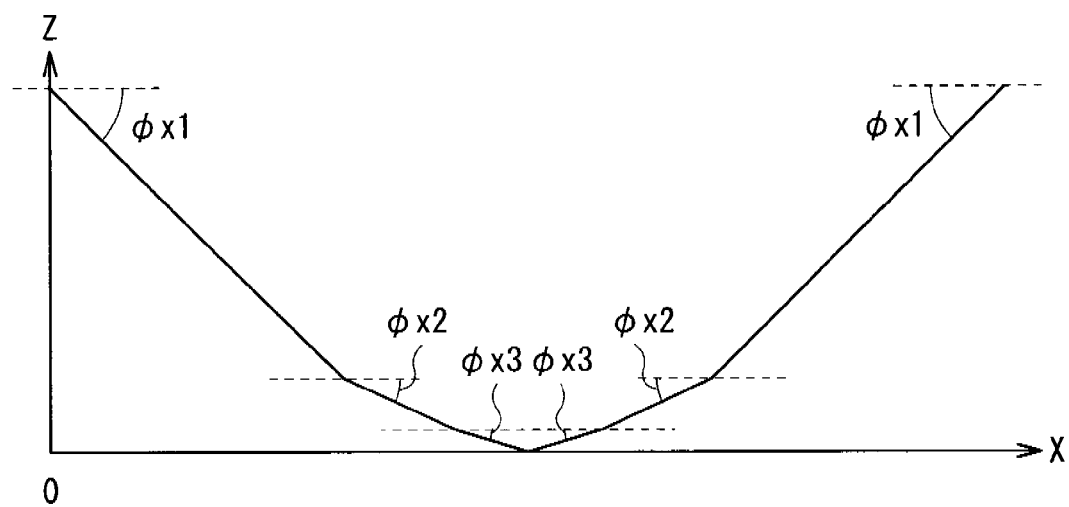
FIG. 18 is a schematic configuration view of a tooth of a cutting tool used when manufacturing the light source image segmentation sheet of FIG. 1.
Figure 19:
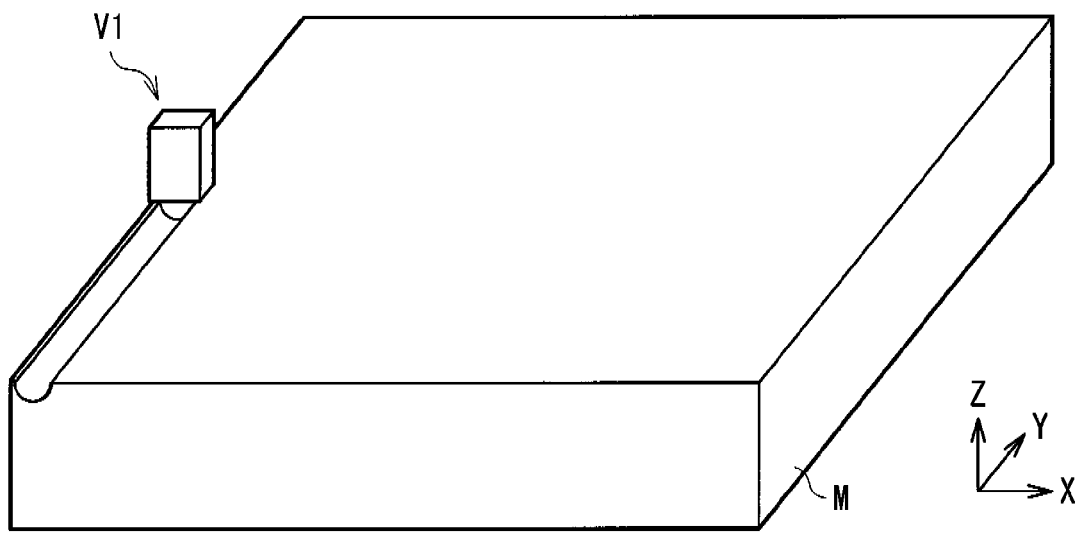
FIG. 19 is a perspective view showing a state in the course of cutting operation in the y direction using the cutting tool of FIG. 18.
Figure 20:
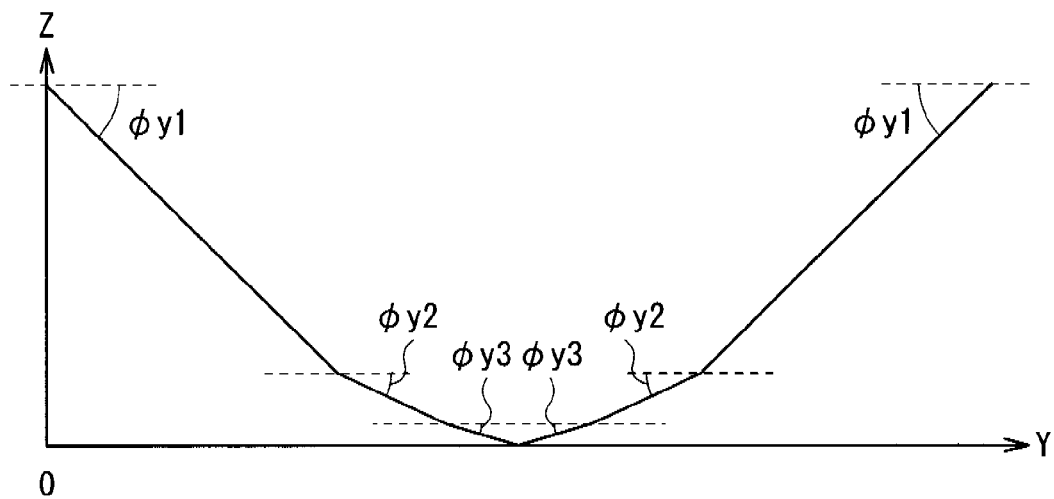
FIG. 20 is a schematic configuration view of a tooth of another cutting tool used when manufacturing the light source image segmentation sheet of FIG. 1.
Figure 21:
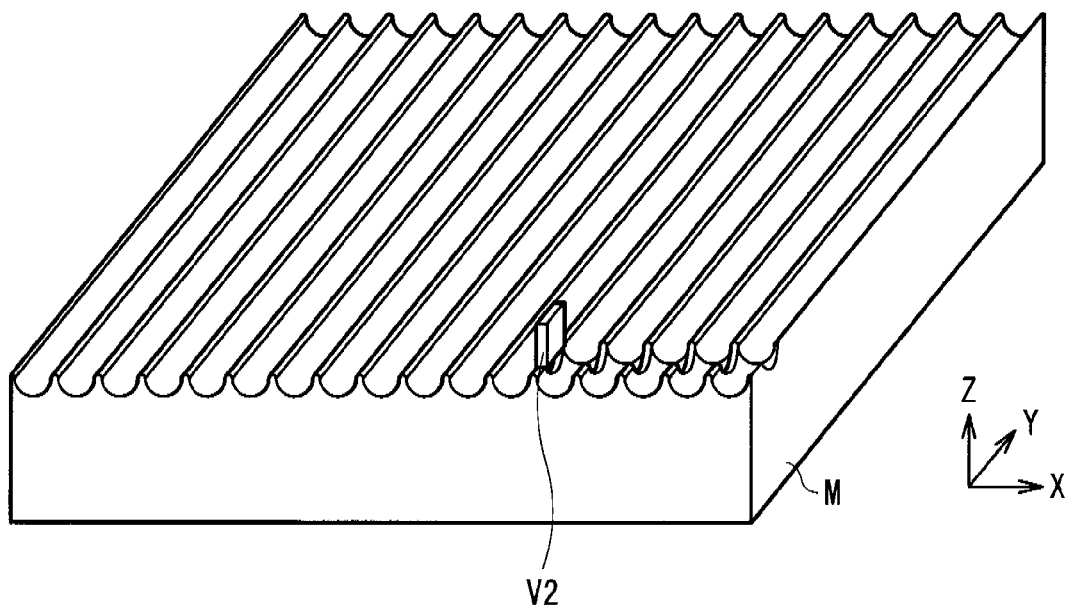
FIG. 21 is a perspective view showing a state in the course of cutting operation in the x direction using the cutting tool of FIG. 20.
Figure 22:
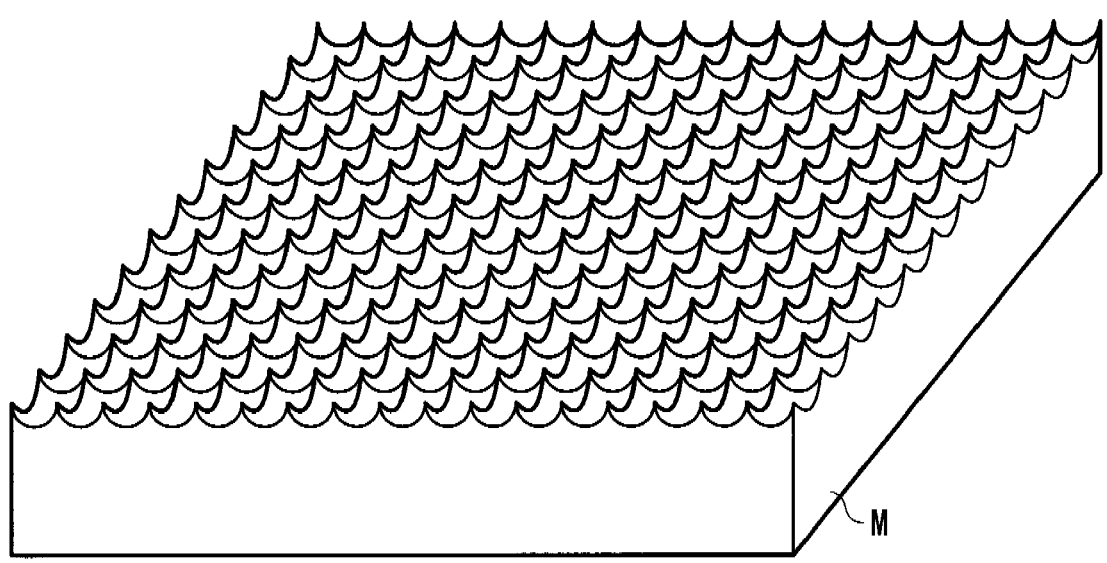
FIG. 22 is a perspective view of an original plate used when manufacturing the light source image segmentation sheet.

Hereinbelow, an example of formation method of the light source image segmentation sheet 13 of the present embodiment will be explained with reference to FIGS. 18 to 22. FIG. 18 shows an example of a tooth configuration of a cutting tool V1 used when cutting in the y-axis direction. FIG. 19 schematically shows a state in the course of cutting an original plate M in the y-axis direction using the cutting tool V1. FIG. 20 shows an example of a tooth configuration of a cutting tool V2 used when cutting in the x-axis direction. FIG. 21 schematically shows a state in the course of cutting the original plate M in the x-axis direction using the cutting tool V2. FIG. 22 is a perspective view showing a top surface configuration of the processed original plate M after the cutting-operation.

First, a flat top surface of the original plate M is cut as shown in FIG. 19, in the y-axis direction using the cutting tool V1 with the tooth as shown in FIG. 18. When the cutting work in the y-axis direction has been finished, the processed top surface of the original plate M is then cut in the x-axis direction as shown in FIG. 21, using the cutting tool V2 with the tooth as shown in FIG. 20. In this manner. the original plate M with a tridimensional surface configuration, which is a reverse face of the protrusions 13A and 13B constituting the light source image segmentation sheet 13, has been manufactured as shown in FIG. 22.

Next process is that the original plate M, which is then turned upside dozen so that tridimensional surface configuration thereof faces downward, is pushed against a translucent resin material disposed on one plane. Then, energy such as heat is applied to the resin material with the original plate M having been pressed against it so that the resin material is hardened. In this manner, the tridimensional configuration of the original plate M is transferred, thereby the light source image segmentation sheet 13 is formed.

In the manufacturing method of the present embodiment, the tridimensional configuration that is a reverse face of the light source image segmentation sheet 13 is provided on the original plate M by cutting in two orthogonal directions of the x-axis direction and the y-axis direction. Therefore, it is possible to manufacture the light source image segmentation sheet 13 with ease and at low cost.

EXAMPLE

Next, examples of the lighting device 10 according to the present embodiment will be described as compared with lighting device of comparative examples.

Examples 1 and 2, and Comparative example 1

In Examples 1 and 2 and Comparative example 1. using top emission LEDs of OSRAM Opt Semiconductors, each of the point light sources 12 was constituted from four LED's: one blue LED, two green LEDs and one red LED, to form an LED cluster. Pitches P3 and P4 of the point light sources 12 were 40 mm, respectively. RF220 (trademark) of TSUJIDEN Co., Ltd, was employed as the reflection sheet 11. The reflection sheet 11 was bored out in accordance with the bottom contour of the point light sources 12 so that the point light sources 12 protruded therefrom, thereby disposing the point light sources 12 on the top surface of the reflection sheet 11. In Embodiments 1 and 2, the light source image segmentation sheet 13 as disposed 30 mm away from the reflection sheet 11. In Comparative example 1, a diffusion plate was disposed on the same position instead of the light source image segmentation sheet 13. In Example 1, there was employed the light source image segmentation sheet 13 having the sectional configuration of FIGS. 6A and 6B, and in Example 2, there was employed the light source image segmentation sheet 13 having the sectional configuration of FIGS. 7A and 7B. The light source image segmentation sheet 13 was arranged in such a manner that the angle $\theta 1$ between the ridgeline R1 of the light source image segmentation sheet 13 and the array direction L1 of the point light sources 12 and the angle $\theta 2$ between the ridgeline R2 of the light source image segmentation sheet 13 and the array direction L2 of the point light source 12 were 25 degrees, respectively. In the comparative example 1, a diffusion plate containing filler (PC-9391 (65HLW) (trademark) of Teijin Chemicals Ltd.) was employed instead of the light source image segmentation sheet 13. As the diffusion sheet 14. D141Z (trademark) of TSUJIDEN CO., Ltd. was employed. As the luminance enhancement film 15, BEFIII (trademark) of 3M was employed. As the reflective polarizing sheet 16, DBEF-440 (trademark) of 3M was employed.

Figure 23:
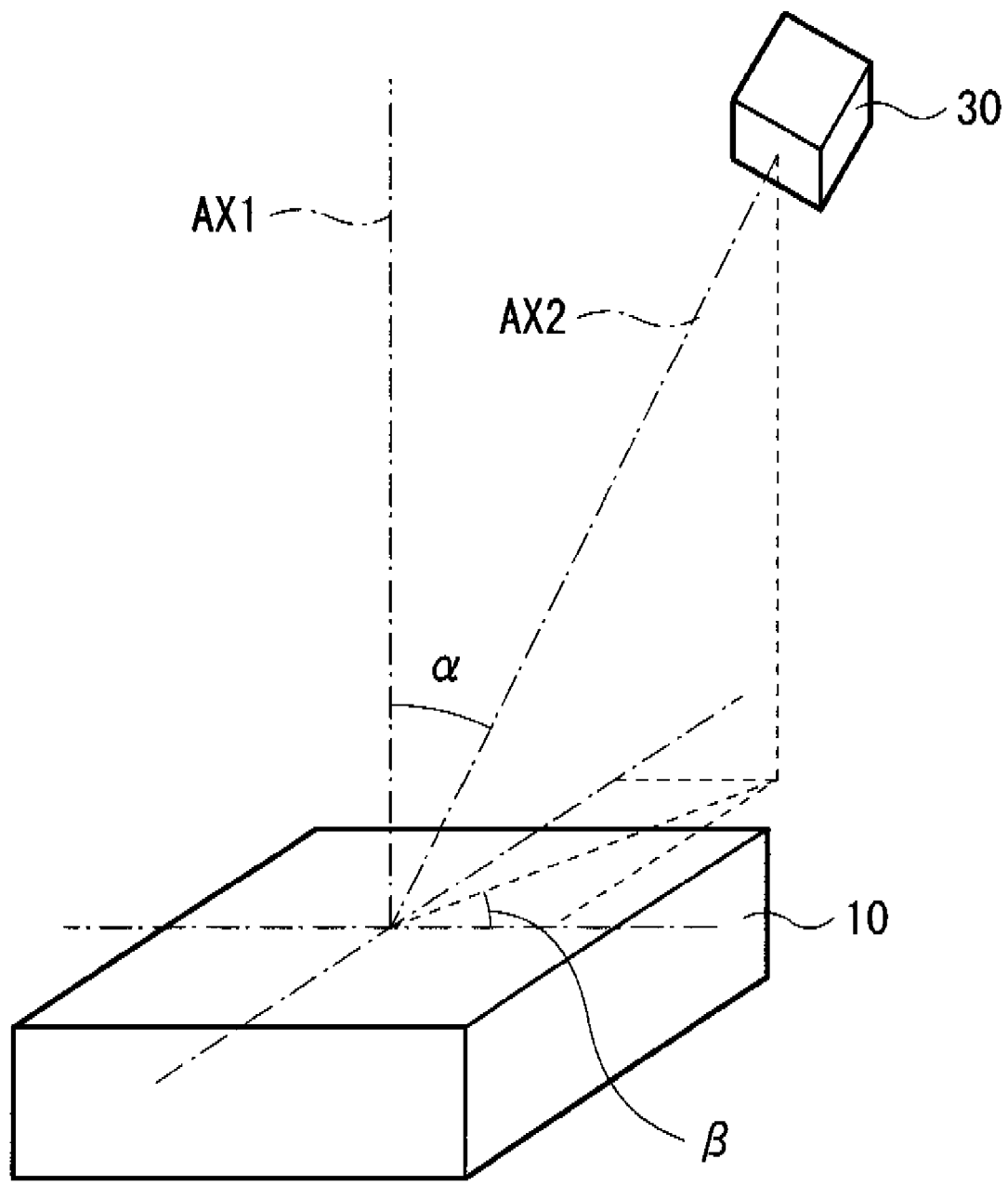
FIG. 23 is a pattern diagram for explaining a method of measuring an in-plane luminance distribution.
Figures 26A, 26B, 26C:
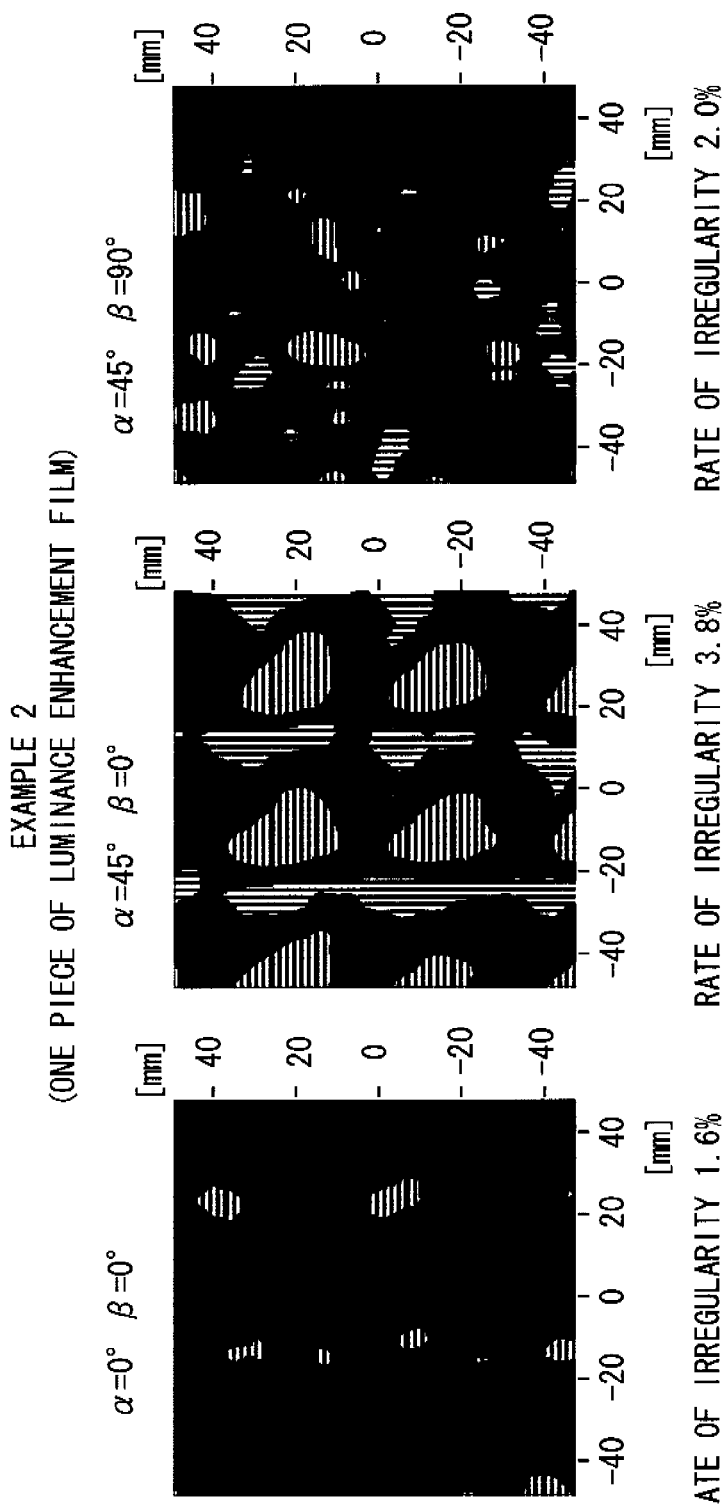
FIGS. 26A to 26C are characteristic charts showing the in-plane luminance distributions and rate of irregularity obtained by actual measurement according to Example 2, where one piece of luminance enhancement film is employed and angles of θ1 and θ2 are 25 degrees.
Figures 28A, 28B, 28C:
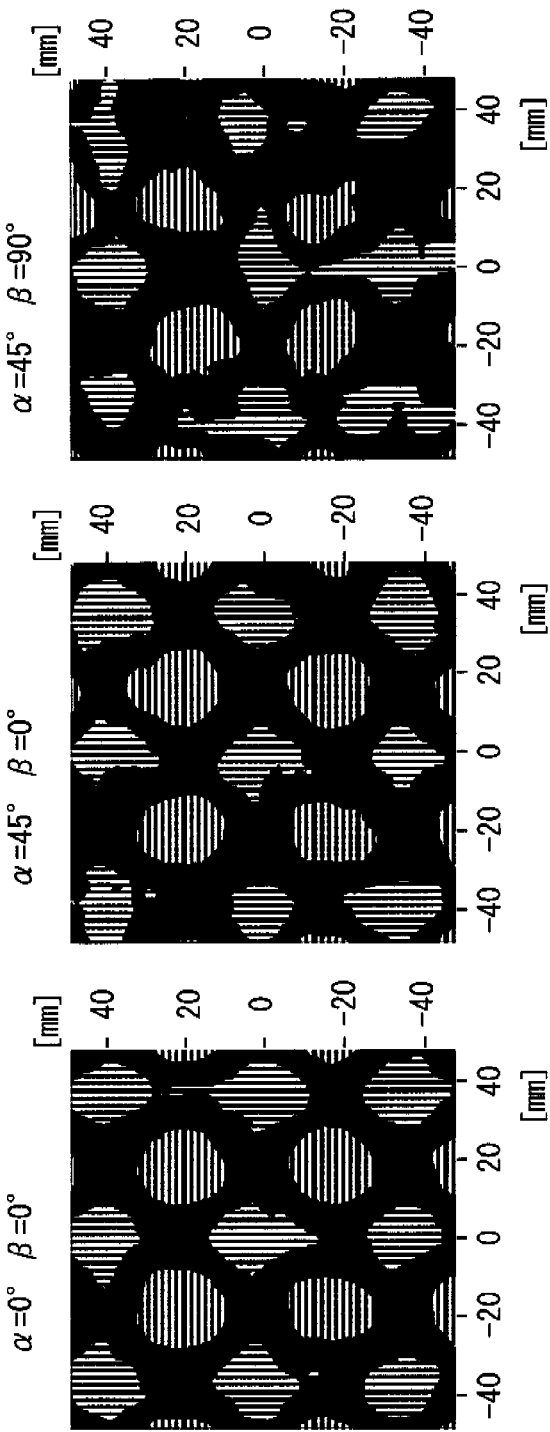
FIGS. 28A to 28C are characteristic charts showing the in-plane luminance distributions and rate of irregularity obtained by actual measurement according to Comparative Example 1, where one piece of luminance enhancement film is employed and angles of θ1 and θ2 are 25 degrees.

In-plane luminance distribution was measured to quantitatively evaluate luminance irregularity using a CCD camera. When measuring the luminance irregularity viewed from an oblique direction, a CCD camera 30 was disposed obliquely with the perpendicular direction of the lighting device 10 as shown in FIG. 23. In measurement, letting the angle of an optical-axis AX2 of the CCD camera 30 and the normal AX1 of the lighting device 10 be a transmission angle $\alpha$, and an azimuth of the optical-axis AX2 of the CCD camera 30 be $\beta$, measurement was taken within the a range of (to 60 degrees and the $\beta$ range of (to 360 degrees in increments of 15 degrees. Measurement area was set to 100 mm×100 mm.

In Examples 1 and 2 and Comparative example 1, luminance distributions in the case of employing one piece of luminance enhancement film 15 and in the case of employing two pieces of luminance enhancement films 15 are shown respectively in from FIGS. 24A to 24C to FIGS. 29A to 29C. Here, results for three directions, a perpendicular direction ($\alpha=0°$, $\beta=0°$), an oblique direction ($\alpha=45°$, $\beta=0°$) and another oblique direction ($\alpha=45°$, $\beta=90°$) are representatively indicated for respective cases. In these figures, the point light sources 12 are arranged in an array at four places having coordinates of (+20 mm, +20 mm), (+20 mm −20 mm), (−20 mm, +20 mm), and (−20 mm, −20 mm), respectively. These figures are based on a difference amount in luminance compared with the average luminance. The deep-black portion represents a field within the range of ±0.5% difference from the average value so that the larger the field is, the smaller the difference amount is.

The level of luminance irregularity is distinguishable %% ell enough just by viewing these figures, but to obtain more understandable evaluation, a rate of irregularity is defined as follows:

Rate of irregularity=(maximum luminance−minimum luminance)/average luminance

Figure 30:
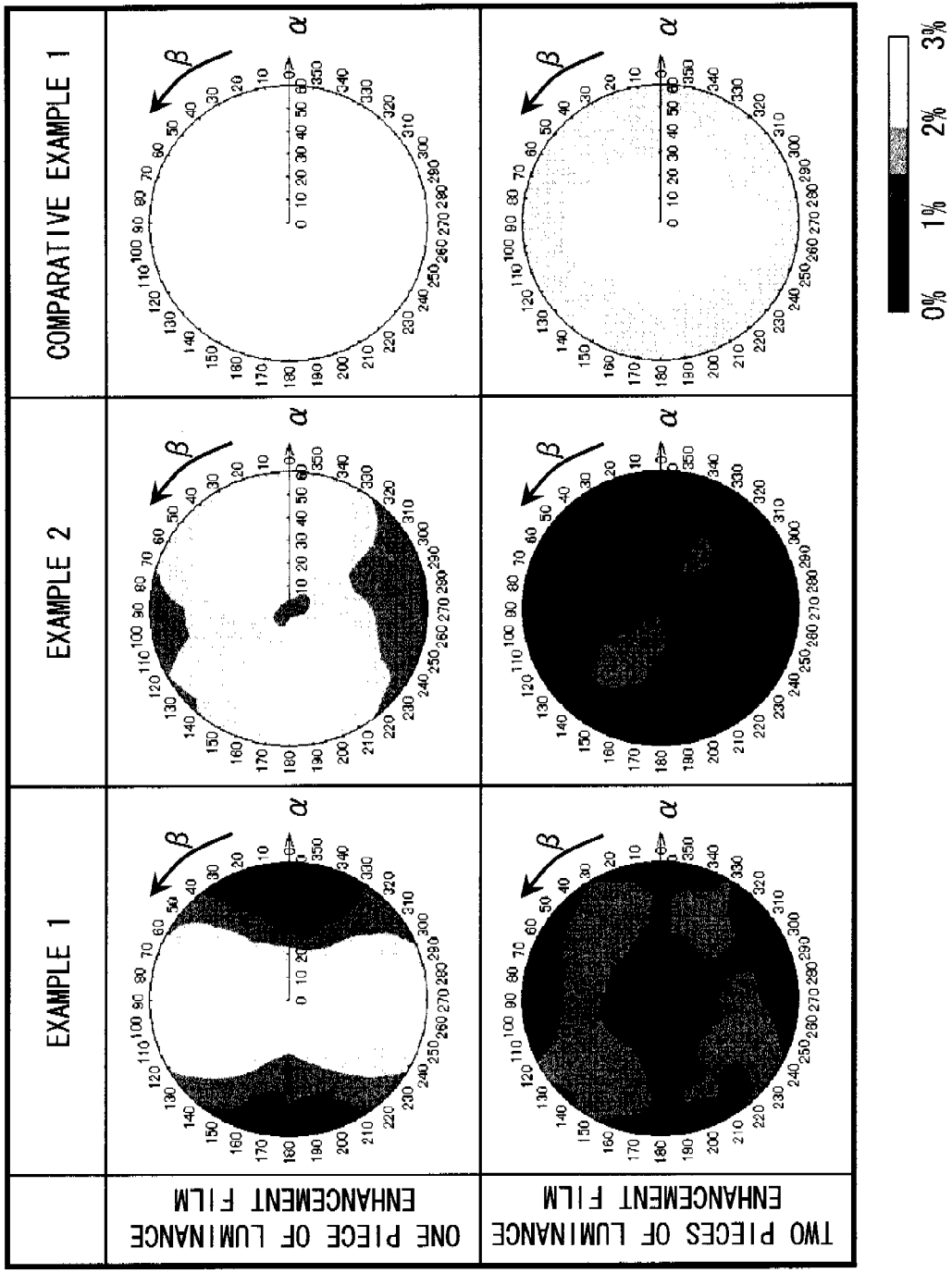
FIG. 30 shows angle distribution of the rates of irregularity obtained in FIG. 24A to FIG. 29C.
Figures 33A, 33B, 33C:
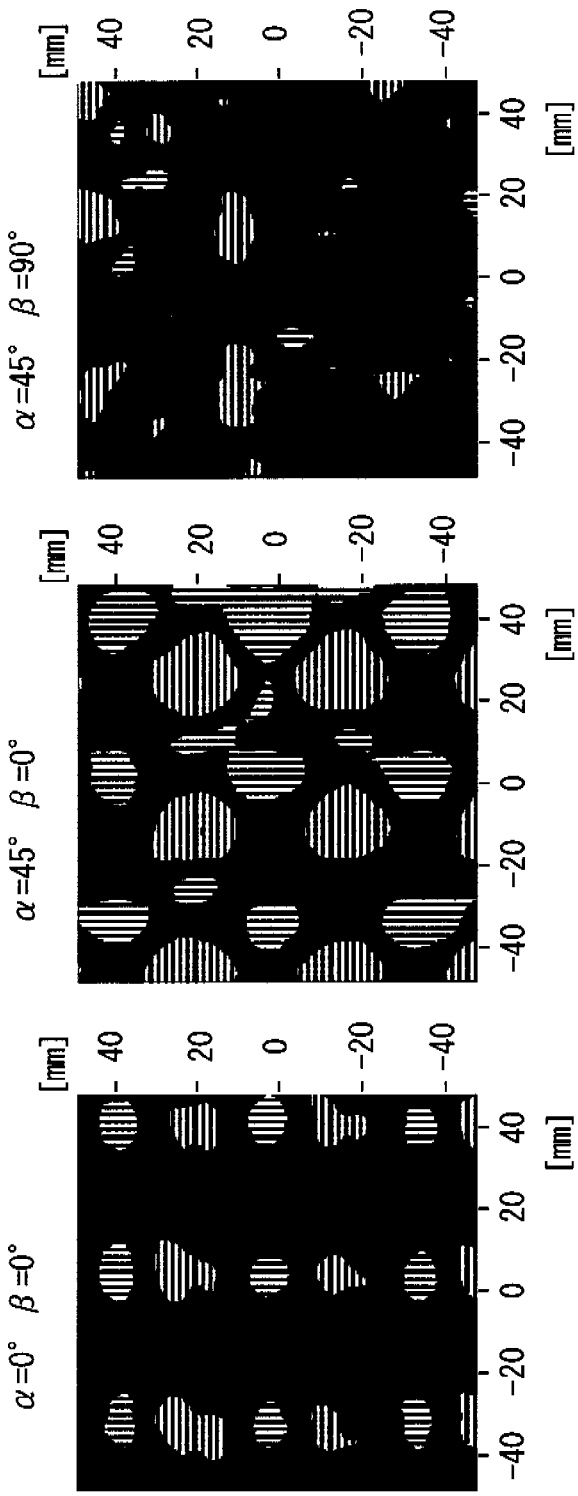
FIGS. 33A to 33C are characteristic charts showing the in-plane luminance distributions and rate of irregularity obtained by actual measurement according to Comparative Example 3, where one piece of luminance enhancement film is employed and angles of θ1 and θ2 are 45 degrees.

Here, the maximum luminance means a maximum luminance in the in-plane luminance distribution, and the minimum luminance means a minimum luminance in the in-plane luminance distribution. The average luminance means an average value in the in-plane luminance distribution. The lower the rate of irregularity is. the more fully the luminance irregularity and color unevenness are suppressed. The rate of irregularity was computed over the range of all available measurement angles for respective cases, thereby forming cylindrical coordinate s)stems that indicate how the rates of irregularity are distributed over the measurement angles (hereinafter referred to as angle-based distribution) in pseudo-color. The results are shown in FIG. 30.

The results obtained suggest that the rates of irregularity, of Embodiments 1 and 2 are smaller than that of Comparative example 1 either when one piece, or two pieces of luminance enhancement films 15 are employed. As is clear from FIG. 30, the results also suggest that the above-mentioned characteristics become more pronounced especially when using two pieces of the luminance enhancement films 15 so that employment of two pieces of the luminance enhancement films 15 can suppress fully enough the luminance irregularity and color unevenness as viewed from any angles. The results also suggest that the distance between the reflection sheet 11 and the light source image segmentation sheet 13 can be narrowed enough without deteriorating the luminance irregularity and color unevenness.

Comparative Examples 2 and 3

Next. luminance irregularity was evaluated also when the light source image segmentation sheet 13 was disposed in such a manner that the angles θ1 and θ2 between the ridgelines R1 and R2 of the light source image segmentation sheet 13 and the array directions L1 and L2 of the point light sources 12 were not 25 degrees, unlike Examples 1 and 2. In Comparative example 2, the luminance enhancement film 15 was disposed so that the angles θ1 and θ2 were set to zero. degrees, and in Comparative example 3, the luminance enhancement film 15 was disposed so that the angels θ1 and θ2 were set to 45 degrees. Here, the light source image segmentation sheet 13 having the sectional configuration of FIGS. 7A and 7B similar to that of Example 2 was used in Comparative examples 2 and 3.

Luminance irregularity was measured and the angle-based distribution was computed with the above-mentioned procedure. In Comparative examples 2 and 3, luminance distributions in the case of employing one piece of luminance enhancement film 15 and in the case of employing two pieces of luminance enhancement films 15 are shown respectively in from FIGS. 31A to 31C to FIGS. 34A to 34C. Here, results for three directions, a perpendicular direction ($\alpha=0°$, $\beta=0°$), an oblique direction ($\alpha=45°$, $\beta=0°$) and another oblique direction ($\alpha=45°$, $\beta=90°$) are representatively indicated for respective cases.

The results obtained suggest that the luminance irregularity and color unevenness can be suppressed more effectively in the case of Example 2 than Comparative examples 2 and 3, especially when using the two pieces of the luminance enhancement films 15.

As mentioned above, although the present application has been described with reference to the embodiments and examples, the present application is not limited to those but may, be variously modified.

For example, in the above-mentioned embodiment and so on, the ridgeline R1 of the light source image segmentation sheet 13 extends in the direction intersecting with the arrant direction L1 of the point light sources 12 at a given angle θ1 (refer to FIG. 5), and the ridgeline R2 of the light source image segmentation sheet 13 extends in the direction intersecting with the other array direction L2 of the point light sources 12 at a given angle θ2 (refer to FIG. 5). To obtain such configuration, in which the ridgelines R1 and R2 of the light source images dividing sheet 13 extend in a direction different from that of the array directions L1 and L2 of the point light sources 12, there are two arrangement manners: one example is that as shown in FIG. 4, the point light sources 12 are arranged so that the array directions L1 and L2 thereof may be parallel to the side walls of the housing 17; another example is that, although not shown, the point light sources 12 are arranged so that the array directions L1 and L2 thereof may be intersecting with the side walls of the housing 17.

In the above-mentioned embodiment, although a specific construction of LCD has been described, it is not necessary that the LCD includes all the layers, or it may further include other layers. For example, in the above-mentioned embodiment, although the light source image segmentation sheet 13 is made of a translucent base material, it may contain some optical diffusion material (filler). In addition. it is preferred that, in the above-mentioned embodiments and so on, a space between the light source image segmentation sheet 13 and the diffusion sheet 14, a space between the luminance enhancement film 15 and the reflective polarizing sheet 16, and a space between a lower luminance enhancement film 15 and an upper luminance enhancement films 15 when two luminance enhancement films 15 are used, are filled with air. However, they may be filled with a certain medium other than air.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lighting device comprising:
a plurality of point light sources arranged in plane with each other; and
an optical sheet arranged in a region facing the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions, wherein
the optical sheet includes a pair of first slant faces opposed each other with the first ridgeline in between and a pair of second slant faces opposed each other with the second ridgeline in between, and
inclinations of the respective first and second slant faces are determined so that an arm length D of each X-shaped light source image, which is obtained by dividing a light source image produced from a light emitted from each of the plurality of point light sources into plural images through the optical sheet, satisfies the following expression when a pitch of the point light sources is defined as P:

$$D \geq P/2.$$

2. A lighting device comprising:
a plurality of point light sources arranged in plane with each other; and
an optical sheet arranged in a region facing the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and wherein extending directions of the first and second ridgelines are respectively determined so that a plurality of X-shaped light source images do not overlap each other.

3. A lighting device comprising:
a plurality of point light sources arranged in plane with each other; and
an optical sheet arranged in a region facing the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and
wherein the extending directions of the first and second ridgelines are respectively determined so that a width of space between a plurality of respective X-shaped light source images are approximately same.

4. A lighting device comprising:
a plurality of point light sources arranged in plane with each other; and
an optical sheet arranged in a region facing the plurality of point light sources, wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and wherein the first direction and the second direction are orthogonal or approximately orthogonal to each other, and an angle of the first ridgeline and the first direction, which is defined as $\theta 1$, and
an angle of the second ridgeline and the second direction. which is defined as $\theta 2$, satisfy the following expressions:

$$10°<\theta 1<40°$$

$$10°<\theta 2<40°.$$

5. A lighting device comprising:
a plurality of point light sources arranged in plane with each other; and
an optical sheet arranged in a region facing the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and
wherein the first direction and the second direction are orthogonal or approximately orthogonal to each other, and
the angle $\theta 1$ of the first ridgeline and the first direction and the angle $\theta 2$ of the second ridgeline and the second direction satisfy the following expression:

$$\theta 1=\theta 2=25°.$$

6. A display unit comprising:
a panel driven based on an image signal;
a plurality of point light sources arranged in a region facing the panel; and
an optical sheet arranged between the panel and the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and
wherein extending directions of the first and second ridgelines are respectively determined so that a plurality of X-shaped light source images do not overlap each other.

7. An optical film having a rectangular shape, and including a first side extending in one direction and a second side extending in a direction orthogonal to the one direction,
wherein the optical film has a tridimensional configuration that includes a first ridgeline extending in a direction that intersects with extending directions of the first and second sides, respectively, and a second ridgeline extending in a direction that intersects with the extending directions of the first and second sides and extending direction of the first ridgeline; and
wherein extending directions of the first and second ridgelines are respectively determined so that a plurality of X-shaped light source images do not overlap each other.

8. A display unit comprising:
a panel driven based on an image signal;
a plurality of point light sources arranged in a region facing the panel; and
an optical sheet arranged between the panel and the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and
wherein the extending directions of the first and second ridgelines are respectively determined so that a width of space between a plurality of respective X-shaped light source images are approximately same.

9. A display unit comprising:
a panel driven based on an image signal;
a plurality of point light sources arranged in a region facing the panel; and
an optical sheet arranged between the panel and the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and
wherein the first direction and the second direction are orthogonal or approximately orthogonal to each other, and an angle of the first ridgeline and the first direction, which is defined as $\theta 1$, and
an angle of the second ridgeline and the second direction, which is defined as $\theta 2$, satisfy the following expressions:

$$10°<\theta 1<40°$$

$$10°<\theta 2<40°.$$

10. A display unit comprising:
a panel driven based on an image signal;
a plurality of point light sources arranged in a region facing the panel; and
an optical sheet arranged between the panel and the plurality of point light sources,
wherein the plurality of point light sources are arranged in a first direction and also in a second direction intersecting with the first direction, and
the optical sheet has a tridimensional configuration that includes a first ridgeline extending in a third direction intersecting with the first and second directions, and a second ridgeline extending in a direction intersecting with the first, second and third directions; and
wherein the first direction and the second direction are orthogonal or approximately orthogonal to each other, and
the angle θ1 of the first ridgeline and the first direction and the angle θ2 of the second ridgeline and the second direction satisfy the following expression:

θ1=θ2=25°.

11. An optical film having a rectangular shape, and including a first side extending in one direction and a second side extending in a direction orthogonal to the one direction,
wherein the optical film has a tridimensional configuration that includes a first ridgeline extending in a direction that intersects with extending directions of the first and second sides, respectively, and a second ridgeline extending in a direction that intersects with the extending directions of the first and second sides and extending direction of the first ridgeline; and
wherein the extending directions of the first and second ridgelines are respectively determined so that a width of space between a plurality of respective X-shaped light source images are approximately same.

12. An optical film having a rectangular shape, and including a first side extending in one direction and a second side extending in a direction orthogonal to the one direction,
wherein the optical film has a tridimensional configuration that includes a first ridgeline extending in a direction that intersects with extending directions of the first and second sides, respectively, and a second ridgeline extending in a direction that intersects with the extending directions of the first and second sides and extending direction of the first ridgeline; and
wherein the first direction and the second direction are orthogonal or approximately orthogonal to each other, and an angle of the first ridgeline and the first direction, which is defined as θ1, and
an angle of the second ridgeline and the second direction, which is defined as θ2, satisfy the following expressions:

10°<θ1<40°

10°<θ2<40°.

13. An optical film having a rectangular shape, and including a first side extending in one direction and a second side extending in a direction orthogonal to the one direction,
wherein the optical film has a tridimensional configuration that includes a first ridgeline extending in a direction that intersects with extending directions of the first and second sides, respectively, and a second ridgeline extending in a direction that intersects with the extending directions of the first and second sides and extending direction of the first ridgeline;
wherein the first direction and the second direction are orthogonal or approximately orthogonal to each other, and
the angle θ1 of the first ridgeline and the first direction and the angle θ2 of the second ridgeline and the second direction satisfy the following expression:

θ1=θ2=25°.

* * * * *